US012284523B2

(12) United States Patent
Salzman et al.

(10) Patent No.: US 12,284,523 B2
(45) Date of Patent: Apr. 22, 2025

(54) IDENTIFYING SPOOFED MARITIME SIGNALS USING INFORMATION FROM OTHER VESSELS

(71) Applicant: Windward LTD., Tel Aviv (IL)

(72) Inventors: Dror Salzman, Tel Aviv (IL); Shay Amram, Herzliya (IL)

(73) Assignee: Windward LTD., Tel Aviv (IL)

( * ) Notice: Subject to any disclaimer, the term of this patent is extended or adjusted under 35 U.S.C. 154(b) by 565 days.

(21) Appl. No.: 17/534,127

(22) Filed: Nov. 23, 2021

(65) Prior Publication Data

US 2023/0164564 A1 May 25, 2023

(51) Int. Cl.
*H04W 12/122* (2021.01)
*G08G 3/00* (2006.01)

(52) U.S. Cl.
CPC ............ *H04W 12/122* (2021.01); *G08G 3/00* (2013.01)

(58) Field of Classification Search
CPC .................. H04W 12/122; G08G 3/00
See application file for complete search history.

(56) References Cited

U.S. PATENT DOCUMENTS

| 2008/0164984 | A1 | 7/2008 | Sheffer |
| 2017/0285178 | A1 | 10/2017 | Platzer et al. |
| 2018/0201348 | A1* | 7/2018 | Delay ................. G08G 3/02 |
| 2020/0184828 | A1 | 6/2020 | Mazor et al. |
| 2020/0264268 | A1 | 8/2020 | Moore et al. |
| 2021/0109235 | A1 | 4/2021 | Anderson et al. |
| 2022/0057528 | A1* | 2/2022 | Bennett ............... H04W 4/029 |
| 2022/0268585 | A1* | 8/2022 | Tulgara ................ B63B 79/15 |

FOREIGN PATENT DOCUMENTS

| CN | 110221319 A | 9/2019 |
| CN | 112991820 A | 6/2021 |
| EP | 3109659 A1 | 12/2016 |
| WO | 2020115731 A1 | 6/2020 |

OTHER PUBLICATIONS

International Search Report issued for International Patent Application No. PCT/IL2022/051170 dated Feb. 14, 2023.

(Continued)

*Primary Examiner* — Yufeng Zhang
(74) *Attorney, Agent, or Firm* — Myers Wolin, LLC

(57) ABSTRACT

A method, system and product for identifying spoofed maritime signals using information from other vessels. The method comprises obtaining one or more location-reporting signals of a maritime vessel, wherein the one or more location-reporting signals comprise one or more respective sets of geographical coordinates, each of which having a timestamp. The method further comprises determining that the one or more location-reporting signals are at least partially fabricated, wherein said determining is based on a contradiction between a content of the one or more location-reporting signals and information derived from location-reporting signals received from other maritime vessels. The method further comprises performing a responsive action.

16 Claims, 13 Drawing Sheets

(56) References Cited

OTHER PUBLICATIONS

Iphar et al., "An expert-based method for the risk assessment of anomalous maritime transportation data" Applied Ocean Research, Nov. 30, 2020; vol. 104, No. 102337; pp. 1-51; Retrieved from the Internet: <URL: http:"//www.sciencedirect.com/science/am/pii/S0141118720304314>; Elsevier.

Shahir et al., "Mining Vessel Trajectories for Illegal Fishing Detection"; IEEE International Conference on Big Data (Big Data); IEEE, Dec. 12, 2019; pp. 1917-1927; Retrieved from the Internet: <URL: https://ieeexplore.ieeee.org/abstract/document/9006545>.

Mazzarella et al., "AIS Reception Characterisation for AIS on/off Anomaly Detection"; 19th International Conference on Information Fusion (FUSION); Jul. 2016 ; pp. 1-8; IEEE; Retrieved from the Internet: <URL: https://www.researchgate.net/profil/Fabio-Mazzarellapublication/306507552_AIS_Reception_Characterisation_for_AIS_onoff_Anomaly_Detection/links/57bec15408aed246b0f75f2c/AIS-Reception-Characterisation-for-AIS-on-off-Anomaly-Detection.pdf>.

Papi et al., "Radiolocation and Tracking of Automatic Identification System Signals for Maritime Situational Awareness." IET Radar, Sonar & Navigation 9.5 (2015): pp. 568-580; Retrieved from the Internet: < RL: https/ietresearch.onlinelibrary.wiley.com/doi/full/10.1049/iet-rsn.2014.0292>, Jun. 1, 2015.

Iphar et al., "Uses and misuses of the automatic identification system" OCeAnS 2019—Marseille, IEEE, 2019; Retrieved from the Internet: <URL: https://hal-mines-paristech.archives-ouvertes.fr/hal-03736713/document>, Oct. 14, 2019.

Obradovic et al., "Machine leaning approaches to maritime anomaly detection." Nase more: 61.5-6 (2014): 96-101; Retrieved from the Internet: <URL: https://hrcak.srce.hr/file/192572>, Oct. 7, 2014.

Patroumpas et al., "Online event recognition from moving vessel trajectories." GeoInformatica 21 (2017): 389-427; Retrieved from the Internet: <URL: https://link.springer.com/article/10.1007/s10707-016-0266-x>, Aug. 16, 2016.

Cretin et al., "Test data generation for false data injection attack testing in air traffic surveillance." 2020 IEEE International Conference on Software Testing, Verification and Validation Workshops (ICSTW). IEEE, 2020; Retrieved from the Internet: <URL: https://hal.science/hal-03221904/document>, Oct. 28, 2020.

* cited by examiner

| Vessel Name | Sanctions Compliance Risk | IMO | MMSI | Flag | Class | Subclass | Length | Year of Build |
|---|---|---|---|---|---|---|---|---|
| AMETHYST MTS | High Risk | 9233777 | 210110000 | 🏳 | Tanker | Crude Oil Tanker | 274 | 2003 |
| LAGAN | High Risk | 9224453 | 210105000 | 🏳 | Tanker | Crude Oil Tanker | 274 | 2002 |
| AMOROZA | High Risk | 9224439 | 210141000 | 🏳 | Tanker | Crude Oil Tanker | 274 | 2001 |
| CECILIA A | High Risk | 9228655 | 210122000 | 🏳 | Tanker | Crude Oil Tanker | 274 | 2003 |
| SAINT MARCELLA | High Risk | 9248825 | 210068000 | 🏳 | Tanker | Crude Oil Tanker | 274 | 2003 |
| ZENITH | High Risk | 9236016 | 210077000 | 🏳 | Tanker | Crude Oil Tanker | 274 | 2003 |
| HARI | High Risk | 9197909 | 210128000 | 🏳 | Tanker | Crude Oil Tanker | 334 | 2000 |
| MIRAGE | High Risk | 9216717 | 210126000 | 🏳 | Tanker | Crude Oil Tanker | 332 | 2000 |
| NIKI | High Risk | 9174220 | 210129000 | 🏳 | Tanker | Crude Oil Tanker | 333 | 2000 |
| CAPE BELLAV | High Risk | 9232929 | 210045000 | 🏳 | Tanker | Crude Oil Tanker | 274 | 2002 |

FIG. 3C

| source_id | receiver_id | mmsi | ts | nav_status | lat | lon | cog | sog |
|---|---|---|---|---|---|---|---|---|
| MarineTraffic_9 | 86 | 210105000 | 2/9/21 7:29 | 0 | 7759174 | -37054539 | 2385 | 21 |
| MarineTraffic_9 | 86 | 210105000 | 2/9/21 7:31 | 0 | 7758802 | -37055180 | 2413 | 22 |
| LuxSpace_World | rORBCOMM000 | 210105000 | 2/9/21 7:35 | 0 | 7758126 | -37056325 | 2354 | 20 |
| MarineTraffic_9 | 86 | 210105000 | 2/9/21 7:35 | 0 | 7758126 | -37056325 | 2354 | 20 |
| MarineTraffic_9 | 86 | 210105000 | 2/9/21 7:38 | 0 | 7757606 | -37057207 | 2414 | 23 |
| ExactEarth_World | 66 | 210105000 | 2/9/21 8:10 | 0 | 7751804 | -37067462 | 2378 | 21 |
| LuxSpace_World | rORBCOMM000 | 210105000 | 2/9/21 8:11 | 0 | 7751620 | -37067763 | 2413 | 22 |
| MarineTraffic_9 | 86 | 210105000 | 2/9/21 8:15 | 0 | 7750975 | -37068865 | 2389 | 22 |
| LuxSpace_World | rORBCOMM000 | 210105000 | 2/9/21 8:15 | 0 | 7750975 | -37068865 | 2389 | 22 |
| LuxSpace_World | rORBCOMM000 | 210105000 | 2/9/21 8:15 | 0 | 7750975 | -37068865 | 2389 | 22 |
| ExactEarth_World | 66 | 210105000 | 2/9/21 11:54 | 0 | 7735 | -37092 | 511 | 63 |
| MarineTraffic_9 | 3226 | 210105000 | 2/9/21 11:57 | 0 | 7735406 | -37092178 | 40 | 6 |
| LuxSpace_World | rORBCOMM000 | 210105000 | 2/9/21 11:57 | 0 | 7736 | -37092 | 4 | 0 |
| LuxSpace_World | rORBCOMM000 | 210105000 | 2/9/21 12:20 | 0 | 7736640 | -37092090 | 40 | 6 |
| ExactEarth_World | 66 | 210105000 | 2/9/21 12:30 | 0 | 7736 | -37092 | 4 | 0 |
| ExactEarth_World | 66 | 210105000 | 2/9/21 12:33 | 0 | 7736894 | -37092071 | 40 | 6 |
| ExactEarth_WorldL | 66 | 210105000 | 2/9/21 12:33 | 0 | 7736912 | -37092070 | 40 | 6 |
| uxSpace_World | rORBCOMM000 | 210105000 | 2/9/21 12:36 | 0 | 7736 | -37092 | 4 | 0 |
| ExactEarth_World | 66 | 210105000 | 2/9/21 12:36 | 0 | 7736 | -37092 | 4 | 0 |
| ExactEarth_World | 66 | 210105000 | 2/9/21 12:38 | 0 | 7737111 | -37092056 | 40 | 6 |

351 (rows 1-11), 353 (rows 12-20)

*FIG. 3F*

IDENTIFYING SPOOFED MARITIME SIGNALS USING INFORMATION FROM OTHER VESSELS

TECHNICAL FIELD

The present disclosure relates to maritime data analysis in general, and to identifying and handling fabricated location-reporting signals in maritime data, in particular.

BACKGROUND

Maritime vessel tracking may be achieved through the use of location-reporting signals such as Automatic Identification System (AIS) signals. Information provided by AIS equipment, such as identification, position, course, and speed, can be displayed on a screen or an Electronic Chart Display and Information System (ECDIS). AIS transmissions may allow maritime authorities to track and monitor vessel movements, geolocation, speed, or the like. AIS equipment integrates a standardized Very High Frequency (VHF) transceiver with a positioning system such as a Global Positioning System (GPS) receiver, with other electronic navigation sensors, such as a gyrocompass or rate of turn indicator. Vessels fitted with AIS transceivers can be tracked by terrestrial stations that are fitted with AIS receivers, which may be located along coast lines. When out of range of terrestrial networks, the vessels can be tracked through satellites that are fitted with AIS receivers.

BRIEF SUMMARY

One exemplary embodiment of the disclosed subject matter is a method comprising obtaining one or more location-reporting signals of a maritime vessel, wherein the one or more location-reporting signals comprise one or more respective sets of geographical coordinates, each of which having a timestamp; determining that the one or more location-reporting signals are at least partially fabricated, wherein said determining is based on a contradiction between a content of the one or more location-reporting signals and information derived from location-reporting signals received from other maritime vessels; and performing a responsive action.

Another exemplary embodiment of the disclosed subject matter is a non-transitory computer readable medium retaining instructions, which instructions, wherein read by a processor, cause the processor to perform: obtaining one or more location-reporting signals of a maritime vessel, wherein the one or more location-reporting signals comprise one or more respective sets of geographical coordinates, each of which having a timestamp; determining that the one or more location-reporting signals are at least partially fabricated, wherein said determining is based on a contradiction between a content of the one or more location-reporting signals and information derived from location-reporting signals received from other maritime vessels; and performing a responsive action.

Yet another exemplary embodiment of the disclosed subject matter is a system comprising: a processor and a memory, wherein the processor is configured to perform: obtaining one or more location-reporting signals of a maritime vessel, wherein the one or more location-reporting signals comprise one or more respective sets of geographical coordinates, each of which having a timestamp; determining that the one or more location-reporting signals are at least partially fabricated, wherein said determining is based on a contradiction between a content of the one or more location-reporting signals and information derived from location-reporting signals received from other maritime vessels; and performing a responsive action.

Optionally, the other maritime vessels are located within a predetermined range from the reported one or more locations of the one or more location-reporting signals at a time indicated by the one or more location-reporting signals.

Optionally, based on information derived from the location-reporting signals received from the other maritime vessels, determining that a likelihood of following a maritime path of the maritime vessel as reported by the one or more location-reporting signals is below a threshold.

Optionally, based on information derived from the location-reporting signals received from the other maritime vessels, determining that a likelihood of following a maritime path of the maritime vessel as reported by the one or more location-reporting signals, while having heading and speed information as reported by the one or more location-reporting signals is below a threshold.

Optionally, said determining is based on environmental conditions as indirectly measured by the other maritime vessels.

Optionally, the responsive action comprises alerting a user to disassociate from the maritime vessel.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 3A-3J illustrate an exemplary scenario, in accordance with some exemplary embodiments of the disclosed subject matter.

DETAILED DESCRIPTION

Figure 1A:
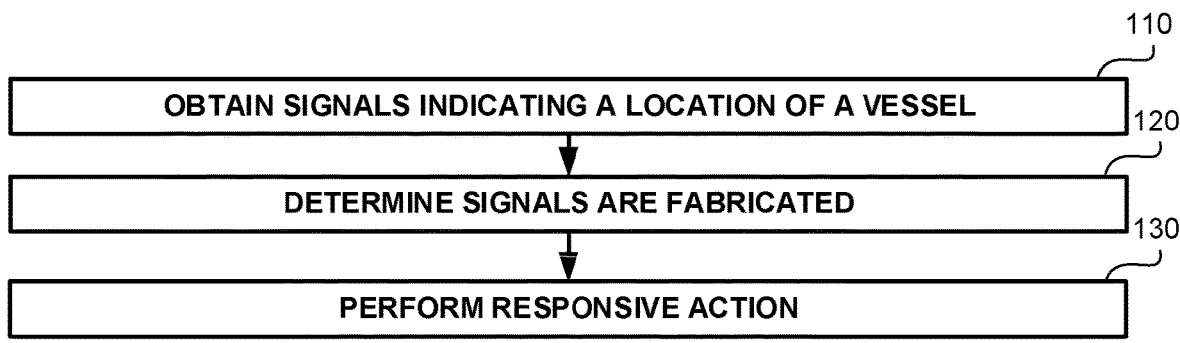
FIGS. 1A-1E illustrate flowchart diagrams of methods, in accordance with some exemplary embodiments of the disclosed subject matter.
Figure 1B:
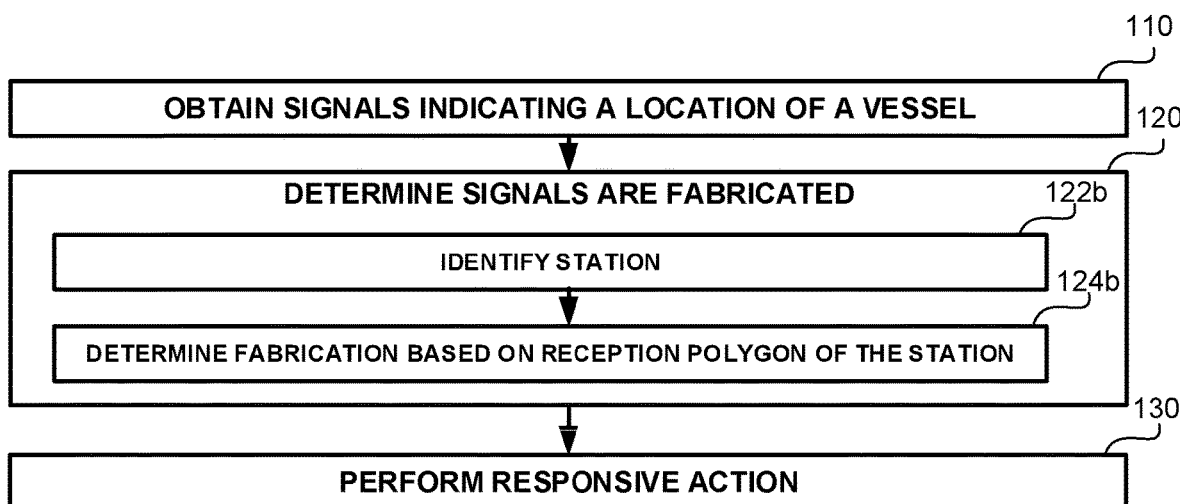
Figure 1C:
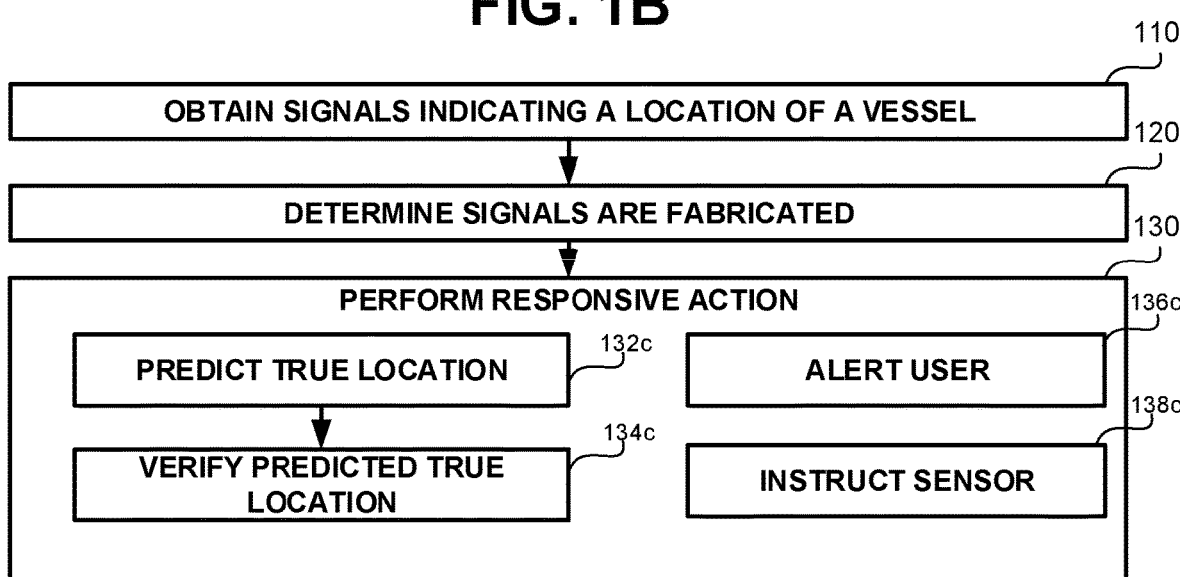
Figure 1D:
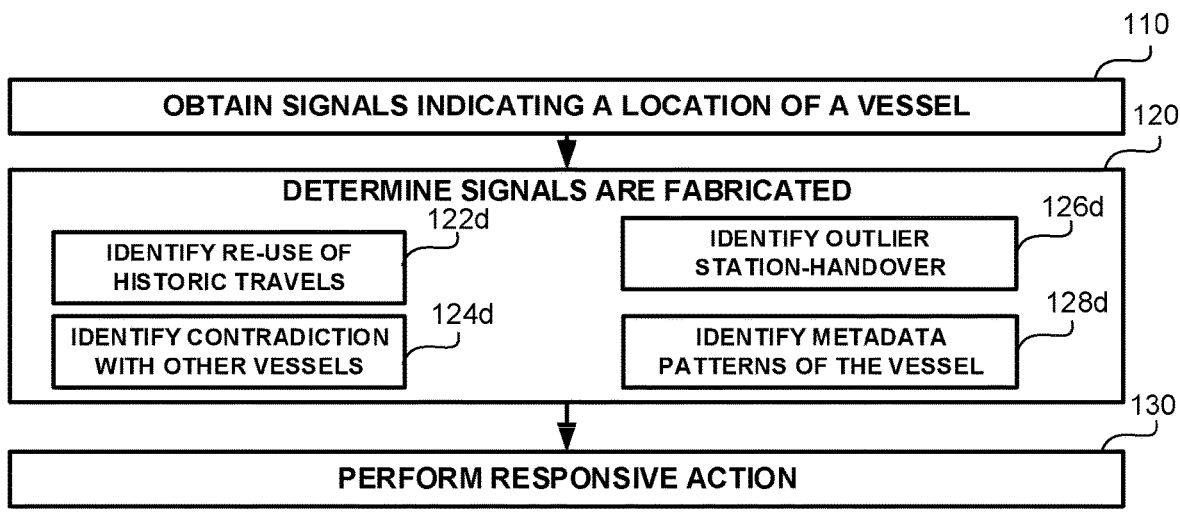
Figure 1E:
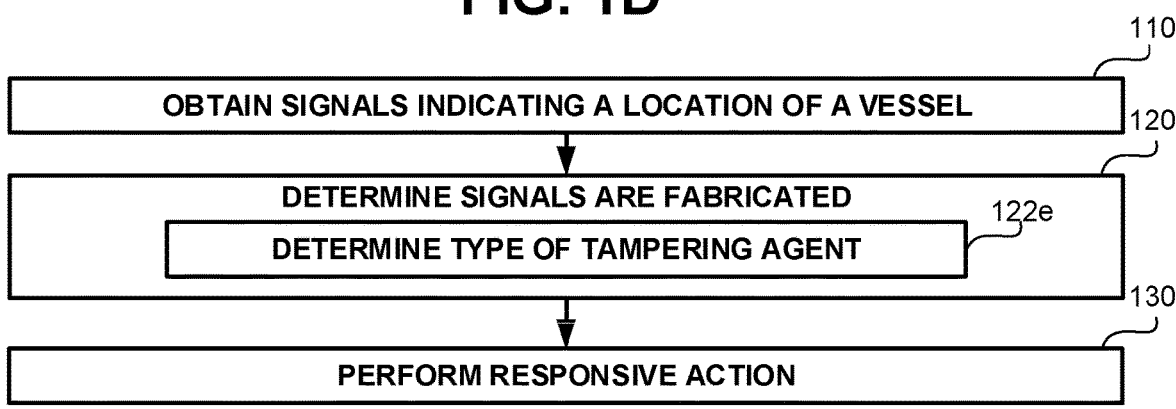

One technical problem dealt with by the disclosed subject matter is to track hidden activities of a maritime vessel. It may be desired to enable non-criminal actors, such as energy traders, financial institutions and bunkering services, to determine which vessels are safe to do business with, in a secure way that protects them from an involuntary involvement in criminal activities such as sanctions evasion, and protects them from associated potentially punitive costs of failing counterparty due-diligence. In some exemplary embodiments, various criminal maritime activities such as illegal fishing, sanctions violation, pirating, drug trafficking, or the like, may be banned by countries, organizations, or the like. In some exemplary embodiments, criminal actors may attempt to disguise their criminal activity, such as by manipulating their Automatic Identification System (AIS)

equipment. In some cases, AIS is turned off, and the nature of the dark activity may be unknown, as is described in detail in U.S. application Ser. No. 17/478,034, entitled "DARK ACTIVITY IDENTIFICATION", filed on Sep. 17, 2021, which is hereby incorporated in its entirety for all purposes and without giving rise to disavowment. In other cases, AIS data may be fabricated, providing inaccurate and false location information, and thereby avoiding from appearing as vessel conducting a dark activity.

In some exemplary embodiments, lawful organizations may seek to minimize the risk of becoming mired in outlawed activity such as maritime sanctions evasion or entering into relationships with parties or vessels who are at high risk of becoming prohibited sanctions targets.

A naïve solution may comprise screening vessels and fleets prior to performing transactions therewith. In some exemplary embodiments, vessels and counterparties may be screened against lists of restricted parties and vessels from the Office of Foreign Assets Control (OFAC), the European Union (EU), United Kingdoms (UK), the United Nations (UN), along with organization-specific red-flag parameters such as the use of flags of convenience, a lack of information regarding beneficial ownership, prior port calls in sanctioned countries, or the like. In case the review process clears a vessel, e.g., if the vessel does not appear in lists of restricted parties and red-flag parameters are not matched, the transactions may proceed. In some exemplary embodiments, the naïve solution may have one or more drawbacks. In some exemplary embodiments, compliance with the naïve method is not effective, at least since it ignores data on vessel behavior that is commercially available and may be highly indicative of sanction evasion risk.

Another technical problem dealt with by the disclosed subject matter is to perform in-depth behavioral analysis in order to screen for suspected maritime criminal offences. In some exemplary embodiments, it may be desired to perform such analysis automatically. In some exemplary embodiments, organizations may be required, by regulations, to apply in-depth behavioral analysis to identify suspected sanctions evasion, or other maritime criminal offences, prior to performing transactions with a vessel. In some exemplary embodiments, it may be almost impossible to manually apply in-depth behavioral analysis to maritime data in a timely fashion and without significantly increasing resources and costs. In some exemplary embodiments, performing in-depth behavioral analysis of maritime data may be challenging, at least since maritime vessels come in different types, have different owners and operators, serve different purposes that may even change in time, may be bound to different regulations, policies or national laws depending on the circumstances, and use different machinery, hardware and software for communication purposes.

Yet another technical problem dealt with by the disclosed subject matter is to identify whether or not location-reporting signals associated with a vessel or fleet have been fabricated, forged, manipulated, faked, spoofed, or the like. In some exemplary embodiments, vessels may measure their current location using sensors such as a Global Positioning System (GPS) receiver, Global Navigation Satellite System (GLONASS), positioning satellite-based radionavigation systems, or the like. In some exemplary embodiments, vessels may communicate their locations via location-reporting signals using communication means such as Satellite-AIS (S-AIS) communications, Very High Frequency (VHF) Data Exchange Systems (VDES), Vessel Monitoring Systems (VMS), satellite-based phones, or the like. In some exemplary embodiments, the communication means may be used in order to report the vessels' positions, unique vessel identification numbers, speed, direction, or the like. In some exemplary embodiments, the location-reporting signals may comprise Automatic Identification System (AIS) messages, which may integrate VHF transceivers with data from positioning systems, electronic navigation sensors such as a gyrocompass or rate of turn indicator, or the like. In some exemplary embodiments, AIS messages may also be referred to as "AIS blips", "AIS transmissions", "AIS signals", or the like. In some exemplary embodiments, an AIS transceiver of a vessel may periodically generate AIS messages comprising a measured location of the vessel, as well as other parameters such as a Maritime Mobile Service Identity (MMSI) number of the vessel, a navigation status, Speed Over Ground (SOG), Course Over Ground (COG), True Heading (TH), rate of turn, positional accuracy, or the like. The MMSI of the vessel may comprise an identification number of the vessel. The navigation status may comprise a status of travel such as "at anchor", "under way using engine(s)", "not under command", or the like.

In some exemplary embodiments, vessels fitted with AIS transceivers, or any other location-communication means, may be tracked by terrestrial stations with AIS receivers (also referred to as 'AIS base stations'), Vessel Traffic Services (VTS), or the like, that may be located along coast lines, on the shore, on a terrestrial vehicle, on a maritime vehicle, or the like. In some exemplary embodiments, terrestrial stations may be able to receive location-reporting signals from vessels that are within its reception polygon range, defining a range of transmissions that can be obtained and processed by the station. In some exemplary embodiments, in addition to or instead of terrestrial networks, vessels may be tracked by satellite-based receivers, such as when out of range of terrestrial networks, simultaneously with the terrestrial stations, or the like. In some exemplary embodiments, terrestrial stations may monitor transmissions from vessels, obtain location-reporting signals, and accumulate raw maritime data therefrom. In some exemplary embodiments, location-reporting signals may include raw maritime data representing geolocation of vessels at respective timestamps, a direction thereof, or any other measurements or parameter values therefrom.

In some cases, an adversary such as a tampering vessel, or a tampering agent thereof, may fabricate one or more values, fields, portions, or the like, of its location-reporting signals. In some exemplary embodiments, the adversary may fabricate locations of a vessel by manipulating communications thereof, e.g., AIS messages, fabricating fields thereof, or the like. In some exemplary embodiments, the fabrication of the messages from a tampering vessel may be performed by an onboard tampering agent, by a remote tampering agent, or the like. In some exemplary embodiments, AIS data such as location data can be fabricated by an adversary, causing the AIS signals to report alternative data in order to mislead or deceive the viewers, the terrestrial stations, maritime analytics stations, or the like. In such cases, terrestrial stations may obtain fabricated location-reporting signals such as fabricated AIS messages including one or more forged fields, such as a forged location, a forged true heading, a forged draft, or the like. In some exemplary embodiments, maritime vessels, as opposed to cars, aircrafts, and other vehicles, are able to continue on their voyage without sending accurate AIS transmissions, without signaling one or more parameters, and even with disabled electricity or functioning instruments. In some cases, vessels may deliberately disconnect instruments, such as positioning equipment, in order to forge alternative data and thereby avoid detection during illicit activities such as a drug trafficking, sanction evasion activity, or the like. In some exemplary embodiments, it may be desired to identify whether the location-reporting signals are in fact fabricated.

Yet another technical problem dealt with by the disclosed subject matter is to identify whether or not a tampering vessel or fleet attempted to perform a hidden activity such as one or more illicit activities, e.g., in case location-reporting signals from the vessel are estimated to be tampered. In some exemplary embodiments, a vessel may intentionally transmit or configure a software or hardware agent to transmit fabricated location-reporting signals (referred to as 'fabricated signals') in order to perform an illicit activity such as a sanction evasion activity in a suspicious context such as around waters or ports of concern, in close proximity to vessels known to be sanctioned, or the like. In some exemplary embodiments, the illicit activity may be performed during a maritime activity such as during Ship-To-Ship (STS) transfers, port calls, or the like.

Yet another technical problem dealt with by the disclosed subject matter is to verify that location-reporting signals from a vessel include fabricated signals with one or more synthetic fields, e.g., with a confidence score above a threshold. In some exemplary embodiments, it may be desired to provide evidence or proof that the fabricated signals are in fact fabricated.

Yet another technical problem dealt with by the disclosed subject matter is to determine a fraudulent period of a vessel. In some exemplary embodiments, a fraudulent period or timeframe may refer to a time period in which location-reporting signals from a vessel are estimated to be fabricated. In some exemplary embodiments, it may be desired to determine a start and an end of the fraudulent period, and to analyze the defined period.

Yet another technical problem dealt with by the disclosed subject matter is to identify a true path with hidden activities that was taken by a tampering vessel during the fraudulent period. In some exemplary embodiments, it may be challenging to locate a tampering vessel during the fraudulent period, at least since the location-reporting signals of the vessel that were received during the fraudulent period are estimated to be fabricated signals that cannot be fully relied upon.

Yet another technical problem dealt with by the disclosed subject matter is to provide warnings to appropriate entities regarding the identified location fabrication event, an identified true location of the vessel, or the like, such as in order to enable organizations to disassociate from the violating vessel.

One technical solution of the disclosed subject matter is to obtain location-reporting signals of a vessel, and utilize the location-reporting signals to estimate whether or not the vessel includes a tampering vessel that is involved in a location fabrication event. In some exemplary embodiments, the location-reporting signals may be analyzed to identify therein self-contradicting measurements, contradicting data that is external to the location-reporting signals, or the like. In some cases, the location-reporting signals may contradict or potentially contradict physical properties associated with maritime travel, such as without limitation movement at sea that is inconsistent with maritime travel, movement at sea that is inconsistent with the surrounding environment as monitored directly using sensors or indirectly using maritime vessels, reception of the signals by a station which cannot receive signals from the reported locations, movement at sea which is highly similar to past voyages, or the like. In some exemplary embodiments, upon identifying a suspicious pattern such as self-contradicting measurements or externally contradicting data, the location fabrication event may or may not be further verified using imagery, triangulation data, or the like.

In some exemplary embodiments, during a fraudulent period, a tampering vessel may transmit fabricated signals that indicate it is sailing or drifting along a maritime path with associated geolocations, while the vessel is truly traveling along an alternative path in a different area, in order to perform hidden activities. In contrast to traditional adversaries, that traditionally attempted to jam or damage outputted location-reporting signals when attempting to perform hidden activities, to cease the signaling, or the like, tampering adversaries may provide fabricated location-reporting signals that comply with the AIS protocol and are therefore more difficult to detect than the traditional adversaries. In some exemplary embodiments, fabricated signals enable adversaries to present themselves as reliable actors, without performing detectable shutdown events. However, in order to assume the role of a reliable lawful actor, the adversary's behavior may be required to comply with constraints, as it may be required to pretend that it complies and cooperates with the AIS protocol, e.g., providing AIS transmissions regularly. It is noted, however, that the disclosed subject matter is not limited to AIS protocols and may be implemented with respect to additional or alternative location-reporting techniques, protocols, or the like.

In some exemplary embodiments, an estimated location fabrication event may be identified, determined, detected, or the like, based on one or more fabrications indicators. In some exemplary embodiments, an estimated location fabrication event may include an event during which an onboard tampering agent or an off-board tampering agent, such as a terrestrial tampering agent, transmits fabricated signals on behalf of the vessel. In some exemplary embodiments, the off-board tampering agent may comprise a software or hardware agent that is located remotely from the maritime vessel, such as on land, on another vessel, near a port of interest, or the like, and transmits one or more location-reporting signals on behalf of the maritime vessel. In some exemplary embodiments, the onboard tampering agent may comprise a software or hardware agent that is located within or onboard the vessel.

In some cases, based on the station(s) receiving the transmissions, it may be determined whether the tampering agent is onboard or off-board. In some exemplary embodiments, if the station receiving the signals changes over time, it may be determined that the tampering agent is onboard, and the location of the vessel may be determined to be within the respective reception polygons of the stations during the relevant times. Each station may have reception polygon representing locations from which the station may receive location-reporting signals. In case of a terrestrial station, or other immobile station, the reception polygon may remain constant. In case of mobile stations, such as satellite stations, the reception polygon may change over time and may be determined based on the blips received at the same time window. In some exemplary embodiments, If the station that receives the location-reporting signals is a terrestrial station and it remains constant, it may be determined that the tampering agent is off-board. In some cases, off-board tampering agents may be located near sanctioned ports. So, if the terrestrial station is near a sanctioned port, it may be more likely that the tampering agent is off-board. In some exemplary embodiments, if the mobile station remains constant over time during the fraudulent period, the reception polygons of the mobile station during the fraudulent period may be analyzed to determine potential locations of the agent, and determine whether it is located onboard or off-board.

In some exemplary embodiments, the same signal may be received by two or more stations. In such a case, the area from which the signal was transmitted may be identified as the intersection of the reception polygons of the two or more stations.

In some exemplary embodiments, the location fabrication event may be determined to be performed during a time period, e.g., a fraudulent period, timeframe, or the like. In some exemplary embodiments, the location-reporting signals may be analyzed to determine a fraudulent period of the location fabrication event. In some exemplary embodiments, the fraudulent period may refer to a period of time during which the location-reporting signals from the vessel are estimated to include fabricated signals. In some exemplary embodiments, prior to the fraudulent period, and after the fraudulent period, the location-reporting signals of the vessel may be estimated to be true, real, accurate, reliable, or the like. In some exemplary embodiments, during the fraudulent period, location-reporting signals may be estimated to be fabricated, partially or fully, by the vessel or an agent thereof. In some exemplary embodiments, the limits or timeframe of the fraudulent period may be determined, estimated, or the like, based on drifting or other sailing patterns of the vessel that are estimated to be synthetic, fabrication indicators derived from the location-reporting signals, or the like. In some cases, the fraudulent period of an analyzed vessel may be determined to include a period in which the vessel transmitted only a specific type of AIS messages, or avoided sending other types of messages. For example, in some cases, agents may send only type 3 AIS messages, which are "position report" messages according to the AIS protocol. In some cases, other types of AIS messages may be transmitted during non-fraudulent periods, such as messages indicating voyage information, messages indicating static information, or the like.

In some exemplary embodiments, location fabrication events may be characterized by a variety of fabrications indicators. In some exemplary embodiments, compliance with one or more fabrication indicators may be determined based on the location-reporting signals, on behavioral anomalies, external data sources, or the like. In some exemplary embodiments, a fabrication indicator may include identifying contradictions or false data based on the location-reporting signals of the vessel, such as data indicating that the vessel traveled in a reported path that is not feasible due to technical limitations, data indicating that the vessel traveled in a certain reported area while the location-reporting signals from the vessel were received by terrestrial stations at a different area, data indicating that the vessel was not affected by environmental conditions that were measured in the reported area during the fraudulent period, identified anomalies, data indicating that the reported path of the vessel is a reply of a recorded true path of another vessel, or the like.

In some exemplary embodiments, a fabrication indicator may include identifying that a reported location of the analyzed vessel contradicts reception polygons of reception stations. In some exemplary embodiments, each station may have a reception polygon, circle, or the like, representing a coverage range of the station. It is noted that the disclosed subject matter uses the term "reception polygon" without limiting the shape to that of a polygon. Reception polygon may include an area of any shape in from which signals can be received by the station. In some cases, the reception polygon may be constant, such as in case of a terrestrial station, or dynamic, such as the case with mobile stations. In some exemplary embodiments, location-reporting signals may be received at a station in case the transmitter of the location-reporting signals is within the reception polygon of the station. In some exemplary embodiments, the range of discovery of stations may define an area or zone in which the stations are able to receive AIS signals, location-reporting signals, or the like. In some exemplary embodiments, one fabrication indicator may be based on matching between the reported location and the reception polygon. In some exemplary embodiments, stations that received location-reporting signals from the vessel may be analyzed, as well as stations that did not receive the location-reporting signals from the vessel although they were expected to receive the signals as they are positioned within the range of the reported location. In case the tampering agent is a terrestrial-based agent, the location-reporting signals may be received by terrestrial stations with reception polygons that cover the position of the agent, instead of by stations with reception polygons that cover the reported location of the vessel. In some exemplary embodiments, in case a reported location of the analyzed vessel is received by stations although the vessel's reported location is not within the reception polygons of the receiving terrestrial stations, this may constitute a fabrication indicator, indicating a location fabrication event has occurred.

In some exemplary embodiments, in case a reported location of the analyzed vessel is not received by stations that are located near the reported location, although the vessel's reported location is within reception polygons of the nearby stations, this may constitute a fabrication indicator. In such cases, prior to determining compliance with the fabrication indicator, the stations that were expected to receive the signals from the vessel may be first analyzed to identify whether they are active. In case a station has obtained location-reporting signals from other vessels in a timeframe having a predetermined duration subsequently to the fraudulent period, prior to the fraudulent period, during the fraudulent period, or the like, the station may be estimated to be active during the fraudulent period. For example, in case signals from other vessels were received by the station within 5 minutes, 10 minutes, 1 hour, or the like, of a signal that was received from the maritime vessel, it may be determined that the station was active during the time the maritime vessel has transmitted its reports. The lack of receiving the location-reporting signals by an active station from the maritime vessel with a reported location within its reception polygon, may be used as a fabrication indicator. In some exemplary embodiments, in case that a reception polygon of a receiving terrestrial station is identified to include a terrestrial area, this may indicate that the tampering agent includes a terrestrial agent that is based in the terrestrial area.

In some exemplary embodiments, the reception polygon of terrestrial stations may be relatively small compared to a reception polygon of satellites station. For example, terrestrial stations may have a reception range of around 40 nautical miles (nm), while satellites may cover an area of around 3,000 nm. In some exemplary embodiments, satellite stations that receive the location-reporting signals may not necessarily be used for determining a location fabrication event, at least since satellite stations may have a large enough coverage range or reception polygon that it cannot be used to differentiate between fabricated signals and true location-reporting signals, as they may both indicate locations within a same reception polygon of the satellite. In some cases, reception polygons of satellite stations may be utilized when correlated with time windows to identify potential mismatches between the reported location and the reception polygon of the receiving satellite station.

In some exemplary embodiments, a fabrication indicator may include identifying that one or more measurements in the location-reporting signals of the vessel contradict physical properties dictated by maritime travel, external data such as environmental measurements that are indicated by nearby vessels, environmental measurements that are indicated monitoring stations or measured by other sensors, technical constraints on path shapes, or the like. In some cases, a drifting state of a vessel may be generated synthetically by an agent, and may be identified as being synthetic by determining that the measurements of the vessel look different from measurements of nearby drifting or sailing vessels at the same timeframe. In some exemplary embodiments, in case the maritime paths indicated by the vessel are not influenced by environmental conditions such as waves, wind conditions, or the like, that were measured in the reported area, a location fabrication event may be determined. For example, environmental conditions in the reported area of the vessel may be identified based on parameters reported by nearby vessels. As another example, the vessel may report measurements that are not affected by a wind direction that affects all of the nearby vessels, thus constituting a fabrication indicator. In some exemplary embodiments, in case the maritime paths indicated by the vessel form unnaturally exact or symmetrical path lines, a location fabrication event may be determined. In some exemplary embodiments, in case the maritime paths indicated by the data cannot technically be traveled by a vessel due to technical constraints such as to impossible angles of motion, impossibly sharp turns, impossible maneuvers, fully symmetrical paths, impossible geometrical paths such as a perfect circle, remaining at the same exact location over time, or the like, a location fabrication event may be determined. In some exemplary embodiments, technical constraints on speeds, path angles, or the like, may be determined based on a type of vessel that is reported by the vessel, based on physics, heuristics that are valid for multiple types of maritime vessels, or the like.

In some exemplary embodiments, a fabrication indicator may include identifying one or more suspicious raw data patterns in a corpus of accumulated location-reporting signals from the vessel over time. For example, AIS signals from the analyzed vessel may be accumulated over time and processed to identify suspicious patterns therein, that are estimated to be synthetic. In some exemplary embodiments, a suspicious raw data pattern may include identifying uniform, duplicated, or consistent values of Course Over Ground (COG) and Speed Over Ground (SOG) parameters, within the location-reporting signals, which may be transmitted in sections in order to mimic drifting patterns of vessels. In some exemplary embodiments, a suspicious or contradictory raw data pattern may include identifying matching or identical values of True Heading (TH) and COG parameters, for a reported low speed of travel, e.g., under 3 knots, under 4 knots, or the like. In some exemplary embodiments, COG measurements may use location sensors such as a GPS in order to indicate a direction toward which the vessel is moving, while TH measurements may use a compass in order to indicate a direction toward which the vessel's nozzle is directed. In order for the COG and TH measurements to be identical, the speed of the vessel must be high, e.g., greater than a speed threshold. Accordingly, in case the reported speed of the vessel is low, e.g., below the speed threshold, and the measurements are identical, this may indicate that at least one of the measurements includes fabricated synthetic measurements. In some exemplary embodiments, a suspicious raw data pattern may include identifying consistent COG values that have inconsistent TH values. In some cases, in case the TH measurements are not fabricated, the TH measurements may continue to change according to the sailing pattern of the vessels, while the COG values may be fabricated and replaced with consistent synthetic measurements. In some exemplary embodiments, a suspicious raw data pattern may include identifying that geographical coordinates of location-reporting signals remain consistent for an extended period of time (e.g., a period over a threshold time, such as over 1 hour, over 5 hours, over 10 hours, or the like). In some exemplary embodiments, any other static or dynamically determined suspicious pattern may be used as a fabrication indicator, and used to determine a location fabrication event.

In some exemplary embodiments, a fabrication indicator may include identifying one or more metadata suspicious patterns. In some exemplary embodiments, suspicious metadata patterns may include a change of a reported ownership of a vessel (e.g., within the past year or other timeframe), independently or in association with additional vessels reporting a change to the same ownership. In some cases, an adversary may purchase multiple vessels with a clean formal history that does not include illicit activities or suspicious patterns, change their reported affiliated flag to the nationality of the adversary, and utilize the vessels in order to perform hidden activities while fabricating their location. In some exemplary embodiments, a suspected fleet associated with the vessel may be identified by searching for vessels that traveled in a similar area, with similar reported paths, similar synthetic data, or the like. In some exemplary embodiments, a suspicious pattern may include identifying destination indicators indicating whether analyzed vessels are using regular destinations prior to the location fabrication event, during the event, following the event, or the like. In some exemplary embodiments, a suspicious pattern may include identifying whether static data of the suspected vessels of the fleet supports the behavioral connection between the vessels of the fleet, such as by determining whether the vessels of the fleet are managed or owned by a same network of companies, whether the vessels sail under a same flag to which all of them registered within a last year or other period, have a same ownership, use same destinations, have similar destination changing patterns, or the like.

In some exemplary embodiments, a fabrication indicator may include identifying that a set of reports is a reply of previously observed reports. In some cases, an entity wishing to spoof and fabricate location-reporting signals may utilize a set of previously observed location-reporting signals and re-transmit such pattern. Such a reply-based spoofing operation can be detected by examining similarity to previously observed sets of reporting signals. In case the current transmitted set is highly similar (e.g., similarity measurement is over a threshold) to a previously observed set, it may be indicative that the current set is not authentic. In some cases, high similarity to many previously observed sets may be even more so indicative. In some exemplary embodiments, similarity may be determined based on the information regarding location, COG, TH, rate of turn, positional accuracy, and similar measurements, but without taking into account other data points of the signal such as MMSI, draft, navigation status, or the like. In case reply-based spoofing is performed, the physical properties may appear to be correct but they may be identical or highly similar (e.g., in case randomness is introduced into the information) to previously observed voyages. In some cases, reply-based spoofing can also be detected based on inconsistency between the spoofed voyage and vessels at the same reported area at the same time, which may indicate different environmental conditions.

In some exemplary embodiments, in case of an off-board tampering agent, the times in which the receiving stations change may be indicative of the start and end time of the fraudulent period. In some cases, location-reporting signals may be observed over time to identify potential transfers from one station to another (also referred to as station-handovers), indicating the normal mode of operation of the AIS stations. In some exemplary embodiments, a graph of nodes representing stations and edges representing observed transfers may be generated. Weights of such edges may indicate how often the transfer is made (e.g., when transferring from station A, the next station is either B (40%), C (10%), D (5%), E (4.99%), F (0.01%). Hence, a transfer from A to B may appear to be non-malicious, while a transfer from A to H may be indicated as likely to indicate malicious activity and the beginning or ending of a fraudulent period, as no such transfer was previously seen. In some cases, a transfer from A to F may also be considered potential indicative of the beginning of ending of a fraudulent period, as the weight of the edge may be below a predetermined threshold, which may be absolute (e.g., seen no more than X times such a transfer), relative (e.g., no more than 1% of the transfers is from A to F), or the like. In some exemplary embodiments, the graph may be utilized as a fraudulent indicator that is relevant to the beginning and end time of the fraudulent period.

In some exemplary embodiments, fabrication indicators may include any other identified data, patterns, compliance with conditions, or the like. In some exemplary embodiments, fabrication indicators may be weighted based on one or more classifiers, heuristics, or the like, which may be used to identify an effect of each fabrication indicator on determining the location fabrication event. In some exemplary embodiments, the classifiers may comprise machine learning classifiers, deep-learning classifiers, Artificial Neural Networks (ANN), Convolutional Neural Network (CNN), Recurrent Neural Network (RNN), artificial intelligent classifiers, heuristics-based classifiers, or the like. In some exemplary embodiments, upon identifying compliance with one or more fabrication indicators, with weighted fabrication indicators that overpass a threshold, or the like, one or more verifications of the location fabrication event may be performed. In some exemplary embodiments, the location fabrication event may be verified by analyzing images depicting the reported location of the vessel during the fabrication period, and verifying that the images do not depict objects that can represent the vessel, are associated with location-reporting signals of another vessel, or the like, thus concluding that the vessel was not located in its reported position. Additionally or alternatively, location fabrication event may be verified by verifying the actual location of the maritime vessel, such as using images of a different location, triangulation of received signals, using sensors, human intelligence (humint) (e.g., obtaining human observation of the vessel in a different location, such as approaching a sanctioned port), or the like. In some exemplary embodiments, actual location of the maritime vessel may be determined by performing Radio Frequency (RF) triangulation, which may enable to detect a location of a vessel based on monitored RF signals that may be emitted from the vessel intentionally or unintentionally. It is noted that other methods may be employed to determine the actual location of the maritime vessel. In some cases, the verification or refutation of the location fabrication event may be utilized to improve the accuracy of the classifiers, such as by re-training the classifiers using the verification or refutation information as actual label of the corresponding data point.

Another technical solution of the disclosed subject matter is identifying a true travel path of the vessel. In some exemplary embodiments, the true travel path may be determined based on stations, such as terrestrial stations, that received location-reporting signals during the fraudulent period. In some cases, the reception polygon of the relevant stations at relevant times may be utilized to determine an area in which the maritime vessel was location in each time window, providing a general rough outline of the vessel's true travel path. In some exemplary embodiments, the true travel path may be determined based on imagery verifications. In some exemplary embodiments, the true travel path may be determined based on any other data, event properties, or the like.

In some exemplary embodiments, a true location of the tampering agent may be determined based on identifying stations that received the location-reporting signals of the vessel during the fraudulent period. In some exemplary embodiments, in case the stations receiving the location-reporting signals from the tampering agent have reception polygons that do not cover the reported false location, the true location of the tampering agent may be determined based on the locations of the stations receiving the location-reporting signals, at the time that the stations received the location-reporting signals from the off-board or onboard agent. In some exemplary embodiments, in case that the list of terrestrial stations receiving the location-reporting signals from the agent stays consistent during the entire fraudulent period, this may indicate that the agent includes a terrestrial tampering agent that stays static, and cannot be used to infer the location of the tampering vessel. Additionally or alternatively, if the intersection of all reception polygons of the stations that received the signals during the entire fraudulent period is a non-empty area, such area may be identified as potentially including the agent. If such area is on-land, it can be determined that the agents is a terrestrial off-board tampering agent. In some exemplary embodiments, in case of an onboard tampering agent, the location of the tampering agent may correspond to the location of the vessel, enabling to detect true geolocations, paths and hidden activities of the tampering vessel based on geolocations and reception polygons of the receiving terrestrial stations.

In some exemplary embodiments, the true paths of the tampering vessel may be estimated by determining a sequence of stations receiving the fabricated signals over time, and estimating that the path is within the reception polygons of the receiving stations at each timeframe. In some cases, such analysis may be based on reception polygons having a relative small area, e.g., below a predetermined area threshold. Additionally or alternatively, the analysis may be based on terrestrial stations only. In some exemplary embodiments, one or more true locations, maritime events, or paths of the tampering vessel during the fraudulent period may be determined based on imagery such as satellite images, drone images, aerial images, radar images, spatial-temporal images of the area, observations, videos, or the like, in which ships are depicted, maritime objects are detected, or the like. Additionally or alternatively, the locations of the tampering vessel may be determined based on RF triangulation data that may enable to detect a location of a vessel based on monitored RF signals that may be emitted from the vessel intentionally or unintentionally.

In some exemplary embodiments, dead reckoning may be employed using algorithmic approach or using machine-learning predictors. In some exemplary embodiments, the location-reporting signal may comprise on top of the reported location (which is not trusted), additional measurements, such as true heading, true speed, speed over ground, course over ground, or the like. Such measurements may be employed to estimate a location of the vessel in the time elapsed since the previous trusted location report. For example, consider a trusted repot $R_1$, followed by untrusted reports $R_2, R_3, R_4 \ldots R_n$. Each report ($R_i$) may comprise reported location $L_i$, timestamp $t_i$, heading information $h_i$ and speed information $s_i$. The location at timestamp $t_1$ may be trusted to be $L_1$. However, at timestamp $t_2$, the reported location $L_2$ may not be trusted. Instead, the location at $t_2$ may be an estimated location $EL_2$. $EL_2$ may be estimated based on a dead reckoning computation from $L_1$, given speed ($s_2$) and heading ($h_2$) information, and given the elapsed time $t_2-t_1$. In some exemplary embodiments, such computation may be used as a fabrication factor, that may be used to estimate whether $R_2$ report is a spoofed report or not. In case the distance between $EL_2$ and $L_2$ is above a threshold, it may be determined that the reported location $L_2$ is spoofed. In some exemplary embodiments, additional parameters may be considered in the computation, such as environmental parameters relating to the wind speed, waves, rain, temperature, humidity, or the like. Such environmental parameters may affect maritime travel and hence may impact the computation. Additionally, or alternatively, vessel information such as draft, size, type of vessel and weight of the vessel may be utilized for the computation.

In some exemplary embodiments, a predictor, such as implemented using deep learning techniques, machine learning techniques, or the like, may be utilized. The predictor may be trained using trusted information, to predict location after elapsed time (e.g., $t_2-t_1$), given speed and heading information (e.g., $s_2, h_2$). In some exemplary embodiments, the predictor may utilize environmental conditions (e.g., wind, temperature, etc.) to make its prediction. In some exemplary embodiments, the predictor may utilize information from nearby vessels located in the same area as the vessel at the same time to make its prediction. For example, given twenty other vessels located within a 50 miles radius from the vessel, each having its own speed and heading information, and making a specific location change in a (potentially different) duration, the predictor may implicitly deduce relevant environmental conditions and improve its prediction. Consider a case where there is a storm at sea, with strong winds and high waves. Such environmental condition may cause the same vessel to travel differently even given the same speed and heading. Additionally, or alternatively, the predictor may take into account vessel information, such as size, vessel type, weight, draft, or the like, so as to take into account how different vessels travel at the current environmental conditions. It is noted that the predictor may also take into account the distance of each other vessel from the vessel being analyzed, as closer vessels may provide more accurate insight into the environment that affects the vessel compared to more distant vessels. In some exemplary embodiments, the predictor may take into account up to a predetermined number of other vessels and their respective information.

In some exemplary embodiments, estimated locations of the vessel may be determined based on historic travels of the vessel, historic travels in the area of the location fabrication event, ports that are in the area of the location fabrication event, suspicious vessels that are in the area of location fabrication event and are potential candidates for performing Ship-to-Ship (STS) transfers, or the like. In some exemplary embodiments, STS transfers may comprise transferring cargo between seagoing ships positioned alongside each other, either while stationary or underway. In some exemplary embodiments, estimated locations of the vessel may be determined based on events of interest, which may be associated with one or more constraints. For example, an estimated path of the vessel may be generated to include at least one maritime activity that is associated with a sanctioned port, a sanction ship, or the like.

In some exemplary embodiments, in case the vessel is estimated to be located in an area that is different from the reported location, such as based on the location of the receiving stations, imagery capturing the estimated area may be utilized in order to attempt and locate the vessel therein. In some exemplary embodiments, an occurrence of an estimated hidden activity of the tampering vessel may be verified based on analysis of images corresponding to a time of the location fabrication event and to a geographical zone of the location fabrication event. In some exemplary embodiments, estimated hidden activities of the vessel may be correlated with imagery capturing the estimated location of the hidden activities at the estimated times of performing the hidden activities, thereby enabling to verify the hidden activities. In some exemplary embodiments, hidden activities may comprise events such as docking inside a feasible port, performing a feasible seagoing transferring event, or the like. For example, a feasible port may include a port that had sufficient resources to receive the vessel during the fraudulent period. In some exemplary embodiments, in case an estimated path of the tampering vessel is estimated to comprise multiple hidden activities, each hidden activity may be verified independently with corresponding images. In some exemplary embodiments, correlating estimated true locations of the vessel with imagery capturing the estimated locations at the time of the location fabrication event, may enable to verify with a high level of certainty that the tampering vessel fabricated its own location while being in a non-reported location.

In some exemplary embodiments, images may be selected to be analyzed in case they are captured at an estimated time of a static maritime activity, e.g., a port event, an STS event, or the like. In some exemplary embodiments, the images may be selected to comprise images that were captured during a static period, e.g., when docking inside the port, or while transferring goods during an STS activity, which may be easier to locate in images. For example, an estimated STS transfer with a suspected vessel may be identified based on processing images and identifying therein a butterfly-like pattern that indicates an STS activity, and determining whether the depicted objects can represent the tampering vessel. In some exemplary embodiments, an estimated STS transfer may be estimated based on properties of the candidate vessels in the area, such as by identifying a second vessel that is associated with a sanctioned entity in the area, identifying a second vessel that performs a shutdown of its location reporting means during the fraudulent period, identifying a second vessel that has suspicious patterns of ownership or destination changes, identifying a second vessel that has a change of draft during the fraudulent period or at an adjacent period without performing a port call (e.g., in a similar time as the tampering vessel), or the like.

In some exemplary embodiments, a User Interface (UI) output may present an overall estimation or probability that a location fabrication event occurred, fabrication indicators that were found for the location fabrication event, verifications of the location fabrication event, verified hidden activities that were performed by the tampering vessel during the fraudulent period, data regarding the verified activities such as images thereof, duration thereof, participating vessels, or the like, estimated paths and hidden events that were or were not verified, or the like. In a UI dimension, a presentation layer may provide warnings to appropriate entities, subscribers, users, or the like, regarding the identified tampering vessel, a determined and/or verified true path of the tampering vessel, a probability that the hidden events were illicit, sanctioned entities that were involved, or the like, such as in order to enable organizations to disassociate from the tampering ship.

One technical effect of the disclosed subject matter includes identifying location fabrication events in an automated manner. In some cases, spoofed information can be identified, its face value may be ignored, and a real-underlying meaning of such information may be utilized.

Another technical effect of the disclosed subject matter includes identifying location fabrication events that may be verified with imagery, observations, or the like. In some exemplary embodiments, fabrication indicators that were found for a location fabrication event may be provided to a user, thus enabling the users to disassociate from involved vessels. The disclosed subject matter provides unbiased, data-driven identification of location fabrication events that is based on a deep contextual analysis of actual ship operations using advanced classifiers, e.g., machine learning classifiers, artificial intelligent classifiers, or the like.

Yet another technical effect of the disclosed subject matter may be estimating or verifying true locations of a tampering vessel during a fraudulent period in which fabricated signals are transmitted from the vessel. In some exemplary embodiments, hidden activities of the tampering vessels that were performed during the fraudulent period may be identified, such as by verifying the activities against objects identified in images using image recognition techniques.

Yet another technical effect may comprise mitigating the risk of real-world businesses to be involved in illicit activities, by improved a tracking and identification of such activities, and providing an automatic analysis of hidden activities. The disclosed subject matter may enable to improve an organization's understanding of maritime risk, and enable them to handle their transactions responsibly, and perform informed decisions without taking unnecessary risks.

Yet another technical effect of the disclosed subject matter may be verifying that a vessel has carried out a hidden activity during a fraudulent period with a high level of certainty, using verification means such as active satellite imagery and RF transmissions. In some exemplary embodiments, the disclosed subject matter provides a verification in a timely manner, without consuming extensive resources and while minimizing interruptions.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIGS. 1A-1E illustrating flowchart diagrams of methods, in accordance with some exemplary embodiments of the disclosed subject matter. It is noted that the different steps of the different methods may be combined with steps of other illustrated methods.

On Step 110, one or more location-reporting signals that are associated with a maritime vessel, such as AIS signals thereof, may be obtained. In some exemplary embodiments, the location-reporting signals may comprise one or more sets of geographical coordinates, one or more timestamps of the geographical coordinates, an identifier of the vessel, one or more sailing parameters such as a speed of the vessel, an ownership of the vessel, an affiliated flag, or the like. In some exemplary embodiments, the one or more location-reporting signals may indicate that the vessel sailed along one or more paths, performed one or more maritime activities, or the like.

In some exemplary embodiments, the location-reporting signals may be obtained, directly or indirectly (e.g., via a data vendor), from one or more stations. The stations may be spread in different locations and each may be associated with a different reception polygon. In some cases, the same signal may be received from two or more stations, therefore providing seemingly duplicative data.

On Step 120, a determination may be made that at least some of the location-reporting signals are fabricated. In some cases, the fabrication may be of a subset of the signals that represents a fraudulent period. In some cases, signals reported before and after the fraudulent period may be non-fraudulent, accurate, and genuine. The determination may be made one or more fabrication indicators. Additionally or alternatively, the determination may be made using a heuristic determination. Additionally or alternatively, the determination may be made using a classifier, such as a deep learning classifier.

In some exemplary embodiments, the one or more location-reporting signals may be classified as fabricated with a full certainty, with a certain probability, with a certain confidence score, or the like, e.g., by one or more classifiers.

In some exemplary embodiments, the determination may be made based on identifying contradictions between raw maritime data within the one or more location-reporting signals. For example, some measurements may not co-exist in the same report or in the same sets of reports. As an example, consider a contradiction of the vessel remaining stationary while reporting moving at a certain speed. In some exemplary embodiments, the determination may be made by identifying contradictions between the one or more location-reporting signals and location-reporting signals from other maritime vessels. For example, information gathered from a fleet of vessels at the same location may be gathered to deduce that the reported behavior of the vessel is unlikely, such as in view of environmental conditions. In some exemplary embodiments, the determination may be made by identifying that a maritime path indicated by the one or more location-reporting signals is unfeasible, such as traveling over land, over shallow water (e.g., in absolute terms, or relative terms, such as with respect to the reported draft).

On Step 122*b*, a station that received the one or more location-reporting signals of the vessel, may be determined, identified, or the like. In some exemplary embodiments, the identity of the station may be determined based on metadata obtained from vendors providing AIS data. Additionally or alternatively, the identity of the station may be indicated in the metadata of the signal information itself.

On Step 124*b*, the fabrication determination may be based on the reception polygon of the station. In some exemplary embodiments, at least one set of geographical coordinates indicated by the location-reporting signals may be determined not to be within a reception range or polygon of the receiving station, such as a terrestrial station.

In some exemplary embodiments, a reception polygon of the station may be obtained, determined, or the like. In some exemplary embodiments, reception polygons of stations may not necessarily be publicly available, reported, or the like. In case it is not available, the reception polygon of the terrestrial station may be derived from historic positions of vessels that were received at the terrestrial station over a defined period, a mapping of historic geographic positions of the vessels when transmitting AIS signals that were received at the terrestrial station, or the like. In some exemplary embodiments, a cluster of the reported locations received by the station may be utilized to determine the reception polygon of the station. In some exemplary embodiments, the reception polygon may be dynamic and change over time. The different polygons of the same station may be determined using data received by other vessels at the same time. Additionally or alternatively, the same signal may be reported by several stations, therefore requiring that the reported location be in an intersection of the reception polygons of all receiving stations that receive the same signal.

In some exemplary embodiments, the reception polygon of the station may be compared to the reported geographical coordinates of the vessel, as indicated by the location-reporting signals. In some exemplary embodiments, in case the reported geographical coordinates of the vessel are within the reception polygon of the station, this may be used as an indicator that the vessel is not a tampering vessel, may be used to reduce a probability that the vessel is a tampering vessel, or the like. In some exemplary embodiments, in case the reported geographical coordinates of the vessel are not within the reception polygon of the terrestrial station, this may indicate that the vessel is a tampering vessel, that a confidence score of classifying the vessel as a tampering vessel is to be increased, or the like.

On Step 122d, fabrication may be identified based on an identified re-use of historic voyages. In some cases, a tampering agent may record a real voyage and may attempt to transmit signals replaying such voyage. In some cases, noise and randomness may be introduced, such as utilizing a pseudo random generator to create a small deviation in various metrics (e.g., avoiding repeating the exact same waypoints or coordinates; reporting modified speed; generating a slightly different true heading measurement; or the like). By comparing the current voyage with previously identified voyages, the disclosed subject matter may be able to identify re-use of historic travels. In some cases, if a voyage is repeated—identically or in a similar manner though not identical—more than expected, it may be deduced that this voyage is actually being falsely reported as part of a location fabrication event. It is noted that such analysis may be performed with respect to a sub-portion of the entire voyage.

On Step 124d, information from other vessels may be leveraged to determine that the signals are fabricated. In some cases, information from other vessels may be obtained, providing an insight into the environment conditions during the reported time in the vicinity of the reporting vessel. In some cases, contradictions between the information deduced from other vessels may indicate that the vessel is providing fabricated location-reporting signals. For example, the wind may affect movement of vessels at sea, and may be extrapolated from reports of other vessels. If the reporting vessel does not behave in a similar manner, such as align itself in a similar manner to the vessels in its surroundings, the reports may be determined to be fabricated. As yet another example, the heading, speed, course, and similar measurements may be affected by waves, winds, rain, or the like. Fabrication may be identified when the vessel's reported behavior contradicts, or is otherwise not in line with that of vessels in its surroundings (e.g., in an area within a predetermined range therefrom.

On Step 126d, station handover events may be obtained and analyzed to identify an outlier station handover event. An outlier station handover may be a station handover between two stations that are not geographically close, that do not have reception polygons one near the other, that is irregular compared to the corpus of data that was gathered, or the like. In some cases, a graph representing station handover events may be created to represent regular distribution of handover events, and which may be useful in identifying outlier events. The outlier station turnover may be indicative of a start of the fraudulent period or of the end of the fraudulent period. In some exemplary embodiments, during the fraudulent period no outlier station turnover events may be present other than the events at the beginning and/or the end of the fraudulent period.

On Step 128d, metadata patterns of the vessel that are indicative of elevated risk may be identified. In some exemplary embodiments, the metadata patterns may include, for example, an ownership change of the vessel that occurred recently (e.g., within a predetermined duration below a threshold). As another example, the metadata pattern may be a recent change in the flag of the vessel. Additionally or alternatively, the pattern may be a destination change occurring recently. In some exemplary embodiments, the metadata pattern may be determined based on the AIS data. Additionally or alternatively, the metadata pattern may be determined using external data sources, such as ownership database, flag database, or the like. The vessel identity may be extracted and relevant databases may be queried for relevant information.

On Step 122e, a determination may be made of a type of tampering agent that is employed. In some exemplary embodiments, it may be determined whether the tampering agent is on-board tampering agent that travels together with the vessel. Additionally or alternatively, it may be determined that the tampering agent is an off-board tampering agent, such as a terrestrial-based agent. In some cases, the determination may be made as part of the determination that the signals are fabricated. In some exemplary embodiments, the determination may be made as part of the responsive action (e.g., Step 130). In some exemplary embodiments, the type of tampering agent may be useful in increasing the confidence in the determination of Step 120.

It is noted that other determination may be performed in Step 120 in accordance with the disclosed subject matter, in an attempt to identify fabricated location-reporting signals.

In some exemplary embodiments, the classification of the location-reporting signals as fabricated may be based on one or more fabrication factors. In some cases, the classification may be based on one or more fabrication indicators, such as identifying contradictions within the raw maritime data of the location-reporting signals, identifying contradictions between the location-reporting signals and location-reporting signals from other maritime vessels, e.g., indicating a wind direction that contradicts the wind direction derived from the location-reporting signals, identifying that a maritime path indicated by the location-reporting signals is unfeasible, e.g., having a symmetrical shape, or the like.

In some exemplary embodiments, the classification of the location-reporting signals as fabricated may be adjusted, affected, or the like, by one or more suspicious factors. In some exemplary embodiments, a probability that the location-reporting signals are fabricated may be adjusted based on identified suspicious patterns of the maritime vessel, such as an ownership change of the vessel, an ownership change of multiple vessels to the same owner as the vessel in suspicious circumstances, a flag change of the vessel, a destination change to a suspicious destination, a destination change during the fraudulent period, a destination change at a location or time that corresponds to historic destination changes of other vessels or of the same vessel, or the like.

In some exemplary embodiments, the classification of the location-reporting signals as fabricated may be verified based on one or more verification techniques, e.g., based on images. For example, images depicting a reported location of the vessel indicated by the location-reporting signals may be selected. The images may depict the sets of geographical coordinates indicated by the location-reporting signals, during the one or more timestamps. In case the selected images are absent of an object potentially depicting the maritime vessel, the location-reporting signals may be verified as fabricated. In some exemplary embodiments, any other verification techniques may be used to verify that the location-reporting signals are not indicative of the true location of the vessel, that the location-reporting signals are indicative of the true location of the vessel, or the like.

On Step 130, a responsive action may be performed, in response to the determination of the fabricated location-reporting signals. In the responsive action may be aimed at mitigating the risk from the location fabrication event. Additionally or alternatively, the responsive action may be aimed at verifying or refuting the determination of the location fabrication event.

On Step 132c, a true location of the reporting vessel may be predicted. In some exemplary embodiments, the true location may be determined using reception polygons of the receiving stations. In some cases, an on-board tampering agent may be employed, and the true location of the vessel may be indirectly revealed by the receiving stations. In some exemplary embodiments, the location of the vessel in different timeframes may be determined based on the reception polygon of the station(s) that received the signals during the timeframe. In some cases, intersection of several reception polygon may be performed, such as in case the same signals are received by several stations. It is noted that the receiving stations may be terrestrial stations, having a relatively smaller reception polygons. Additionally or alternatively, satellite stations may also be employed, albeit their larger reception polygons, when taken together with additional information, such as reception polygons of other stations.

In some exemplary embodiments, the true location of the reporting vessel may be determined based on the location-reporting signals themselves. For example, in case of AIS messages, the message may include GPS information, which may be considered as spoofed and unreliable. The AIS message may also include additional data, such as derived from the vessel's bus. In some cases, a party wishing to spoof its location data, may disconnect the GPS module from the vessel's AIS reporting module and connect instead a GPS spoofing module, which may provide fake GPS readings. However, in some cases, the party may not disconnect the AIS reporting module from the vessel's bus. In some cases, it may be harder to disconnect such a module or even impossible in some configurations. Hence, non-GPS information may still be valid and accurate. In some cases, the AIS message may include true heading, true speed, or the like. In some exemplary embodiments, using the last known reliable reporting location can be used together with the true heading, true speed, speed over ground, course over ground, or the like, and without relying on the newly reported location itself, to compute estimated location of the vessel, such as using the dead reckoning method.

In some exemplary embodiments, a deep learning module may be trained to predict a location of vessel based on previous location, true heading, true speed, elapsed time, and additional environmental information. The deep learning module may utilize an artificial neural network, a convoluted neural network, a deep neural network, or the like, for its computation. Such deep learning module may be trained using reliable data and used to predict the location of the vessel during a fraudulent period. The deep learning module may provide a more accurate prediction than analytical dead reckoning, as it may take into account environmental information, such as winds, waves, or the like, for its prediction. The environmental information may be directly measured, such as by sensors measuring such information directly. Additionally or alternatively, the environmental information may be indirectly measured, such as using information from nearby vessels. Additionally or alternatively, other AI-based techniques may be utilized instead of or in addition to deep learning.

On Step 134c, the predicted true location may be verified. The verification may be based on other information, such as images taken at the relevant timeframe, sigint, humint, or the like. In some exemplary embodiments, a sensor may be instructed to obtain real-time sensory information (138c). As an example, a satellite may be directed to take a real-time picture of the current location. As yet another example, an airplane may be dispatched to take aerial photographs or visually inspect the relevant area. Such information may be used to verify that the predicted location is indeed correct. Additionally or alternatively, similar actions may be taken to verify that the reports are fabricated by taking images or other sensor information from the area of the reported location. As an example, an image may be taken showing vessels at the area of the reported vessel. The vessels that are visible in the image may match location-reporting signals of the vessel, while at the same time, the maritime vessel that reported it is also located at the same area, may not appear in the image, and no object that represents in may be present in the image.

In some exemplary embodiments, as vessels move, the instruction to the sensor may be updated in real-time, based on newly received location-reporting signals. In some exemplary embodiments, reports in recent timeframe, such as within a predetermined elapsed time, may be verified or refuted. In some exemplary embodiments, the time elapsed since the reported signal was transmitted may be utilized to define an area in which the vessel may appear in order to confirm that the location-reporting signal is authentic. For example, in case one hour has passed since a specific set of coordinates were received, an area to which the vessel may have traveled in the elapsed time may be computed and inspected in order to confirm or refute the determination that the signal is fabricated and non-genuine.

In some exemplary embodiments, a user may be alerted (136c) and manual response may be taken by the user.

Figure 2:
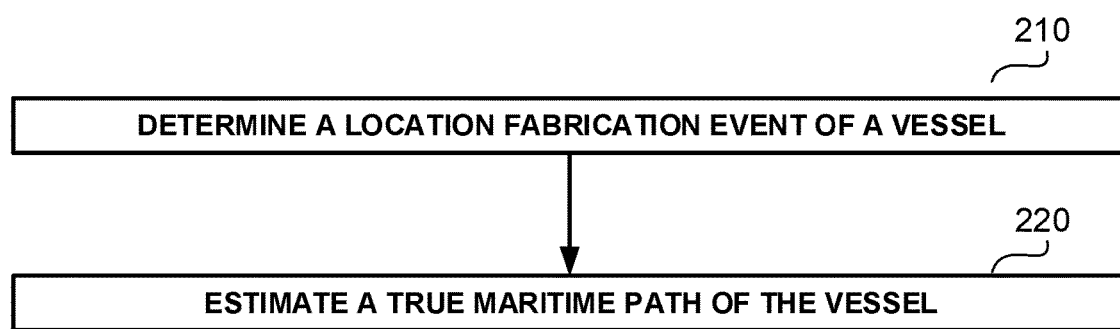
FIG. 2 illustrates a flowchart diagram of a method, in accordance with some exemplary embodiments of the disclosed subject matter.

Referring now to FIG. 2 illustrating a flowchart diagram of a method, in accordance with some exemplary embodiments of the disclosed subject matter.

On Step 210, a location fabrication event of a vessel may be identified based on one or more fabrication indicators, fabrication factors, suspicious factors, suspicious patterns, or the like, e.g., according to Steps 110-140 (FIG. 1). In some exemplary embodiments, location fabrication events may be determined based on identifying contradictions within the raw maritime data of location-reporting signals associated with the vessel, identifying contradictions between the location-reporting signals and external data such as location-reporting signals from nearby maritime vessels, measured environmental factors, or any other data that is external to the location-reporting signals of the vessel.

In some exemplary embodiments, location-reporting signals from a vessel may be estimated to be fabricated, e.g., based on a pattern of parameters in the location-reporting signal, in relation to a pattern of the parameters in location-reporting signals from nearby ships in the same area and time. In some exemplary embodiments, location-reporting signals from a vessel may be determined to be fabricated, e.g., based on verifications that are external to the location-reporting signals, such as from a corpus of satellite imagery, that indicate that the reported location does not depict an object that can represent the vessel. In some exemplary embodiments, location-reporting signals from a vessel may be estimated to be fabricated, e.g., based on identifying a gap between an effective location of data sources such as terrestrial stations that received the location-reporting signals, and the reported location of the vessel. In some exemplary embodiments, a delta between the true location of the vessel and the reported location of the vessel may be computed based on the effective locations of the data sources, e.g., physical or static data sources such as the terrestrial stations. In some exemplary embodiments, location-reporting signals from a vessel may be estimated to be fabricated, e.g., based on a raw data contradiction, such as mismatching COG and TH, impossible paths, or the like, indicating a gap between the true path of the vessel and the reported path of the vessel. In some exemplary embodiments, location-reporting signals from a vessel may be estimated to be fabricated, e.g., based on comparing a behavior of the vessel to historic behaviors of the vessel, such as historic paths thereof. In some exemplary embodiments, location-reporting signals from a vessel may be estimated to be fabricated, e.g., based on anomalies such as the behavior of the vessel not matching a behavior of nearby ships, technical constraints contradicting the reported data, a reported direction contradicting reported measurements, a port call that contradicts the reported type of ship, or any other anomaly. In some exemplary embodiments, location-reporting signals from a vessel may be estimated to be fabricated based on any other indicator, combination thereof, or the like.

In some exemplary embodiments, an adversary may forge a drift mode of the vessel, e.g., by reporting fabricated static measurements, low speed, or the like. In some cases, the adversary may forge a travel mode of a vessel, such as by forging a travel with determined speeds, determined directions, or the like, e.g., which may be more challenging for the adversary. In some exemplary embodiments, a forged travel mode of a vessel may be invalidated by identifying contradictions between the fabricated properties of the travel mode and measured wind direction in the reported area, satellite images in the reported areas of travel, receptive stations covering the reported areas of travel, or the like.

In some exemplary embodiments, when determining location fabrication events based on the location-reporting signals of the vessel, one or more incentives of the adversary may be determined and used when determining weights of the fabrication indicators, the fabrication factors, the suspicious factors, or the like, to adjust a probability of the location fabrication events, or the like. In some exemplary embodiments, adversaries may be enabled to report some fabricated data without having critical consequences, while reporting other types of fabricated data may have damaging or even sever consequences on the vessel. For example, a vessel that reports false draft measurements may endanger himself, possibly causing the vessel to be involved in dangerous unsafe activities, e.g., traveling via unsafe maritime paths, performing unsafe port calls, collisions with ships, or the like. Accordingly, vessels may have an incentive to provide their true draft measurements, although draft changes can be reported at a delay without assuming a critical safety risk. In some exemplary embodiments, vessels may not have an incentive to report fabricated port calls, since port calls may comprise complex activities with multiple constraints such as assisting pilot boats or tugboats, traffic in the port, docking areas, or the like, which may be difficult or even impossible to forge while complying with the port's constraints. In some exemplary embodiments, vessels may not have an incentive to report a false type of vessel, such as identifying a container ships as a Liquefied biogas (LBG) ship that transfers liquid gas or as a crude oil ship. Reporting the wrong type of ship may be inconvenient for an adversary, e.g., since LBG ships and crude oil ship may be very large and therefore easy to spot, and may have many safety and maritime constraints. In some exemplary embodiments, since some parameters may be critical for safety, such as the draft parameter, values of such parameters may have a higher probability to be accurate, at least compared to non-critical parameters. For example, in case a draft of a vessel has changed during the fraudulent period, or a short duration thereafter, this may indicate that cargo has been transferred to or from the vessel, and increase the probability of the location fabrication event, as the draft measurement may be considered reliable.

In some cases, a raw data analysis may consider the probabilities of disconnecting sensors, when determining compliance with a fabrication indicator, a probability of the location fabrication event, a confidence score of the fabrication indicator, or the like. In some cases, fabricating measurements with an onboard tampering agent may require the adversary to detach one or more onboard sensors of the vessel. For example, in order to forge COG measurements, an adversary may be required to disconnect GPS or other location sensors from the AIS transmitter, and connect the AIS transmitter to a tampering agent instead. As another example, in order to forge TH measurements, an adversary may be required to disconnect a built-in compass of the vessel from the AIS transmitter. However, manipulating and disconnecting the compass may be difficult to perform. In such cases, an adversary may have an incentive to detach some sensors while leaving other sensors intact, providing accurate sensor reading. In some cases, an adversary may wish to retain a location sensor without disconnecting the location sensor from the AIS transmitter. In such a scenario, the location measurements may be disrupted in one or more manners, without disconnecting the location sensor from the AIS transmitter of the vessel. For example, the adversary may fabricate the location measurements by "freezing" the coordinates that are obtained by the location sensor prior to starting the hidden travel or activity, and transmitting the same measurements during the entire event. In some exemplary embodiments, when performing partial detaching of sensors, or disrupting of sensor measurements, some fields of the location-reporting signals may comprise synthetic data, e.g., the location fields, and some field may comprise accurate true data, e.g., compass-based fields. In other cases, all the fields may be tampered. In such cases, a suspicious raw data pattern may include identifying synthetic data, duplicated data, "freezing" data, or the like, while considering a probability rate of fabricating each field. In some exemplary embodiments, since some sensors, such as TH sensors, may be more challenging to disconnect, and have more drawbacks for being disconnected, e.g., safety drawbacks, these sensors may have a lower probability of being disconnected and forged.

On Step 220, after identifying the location fabrication event, a true maritime path of the vessel may be determined, e.g., after performing Steps 110-140 (FIG. 1). In some exemplary embodiments, the true maritime path may include one or more potential paths and one or more hidden activities performed along the paths. In some exemplary embodiments, one or more of the fabrication indicators, or associated properties thereof, may be used to identify the location fabrication event may be used to predict the true maritime path. In some exemplary embodiments, maritime images of observations may be used to predict the true maritime path of the vessel. In some exemplary embodiments, any other resources may be used to predict the true maritime path of the vessel.

In some exemplary embodiments, it may be impossible for an adversary to entirely conceal cues of the true path sailed by the vessel, when performing a fabrication of raw sensor data. In some exemplary embodiments, in some cases, fabricated raw data may contradict other properties of the location-reporting signals, such as fabricated or true properties. In some exemplary embodiments, the contradiction may indicate, in some cases, that one or more properties of the location-reporting signals include true measurements, which may be used to predict a real direction of the vessel, a real speed of the vessel, or the like, and to predict the true path based thereon. In some exemplary embodiments, in some cases, fabricated raw data may contradict external properties that are external to the location-reporting signals, such as location-reporting signals from other vessels indicating environmental conditions, or the like. In some exemplary embodiments, in case one or more properties of the location-reporting signals are classified as true measurements, they may be used to predict the true path.

In some exemplary embodiments, a true path of the maritime vessel, including one or more hidden activities, may be predicted based on the reception polygon of the terrestrial station, the fabrication factors, the suspicious factors, or the like. For example, the reception polygons of the terrestrial stations that received the location-reporting signals may be used to define the true area of the vessel. In some exemplary embodiments, one or more parameters of location-reporting signals that are determined to be authentic may be used to predict the real path of the vessel. For example, authentic TH values may be used to determine a direction of travel of the vessel, parameters indicating a wave situation of wind may be used to identify an area with corresponding environmental measurements, or the like. In some exemplary embodiments, one or more true paths may be estimated based on data regarding historic travel paths and events of the vessel, historic paths and events of multiple vessels in the same geographical zone, docking availability slots in ports that are within the geographical zone of the event, identification of shutdown or location fabrication events of an STS partner, parameters of the vessel such as speed that are captured by AIS signals from the vessel prior or after the event, properties or attributes of the event, data sources such as regarding the weather, or the like.

In some exemplary embodiments, the true path of the maritime vessel may be estimated to include one or more hidden maritime activities, which may be the objective of the adversary's fabrication. In some exemplary embodiments, the hidden maritime activities may include STS activities, port calls, or the like. In some cases, a potential true path may be generated to comprise a hidden port call in case the duration of the port call, including traveling thereto and therefrom, is compatible with the duration of the location fabrication event, an average time of unloading cargo in the port, the port's congestion level, whether the port is compatible to global parameters of the vessel such as the vessel's type, weight, diameter, or the like. In some cases, a potential true path may be generated to comprise a hidden STS event in case a candidate second vessel is identified in a relatively small distance from the vessel, the ships are determined to be technically enables to meet during the location fabrication event, e.g., based on the speed capabilities of the ships, their distance, the weather conditions, or the like.

In some exemplary embodiments, the estimated true paths of the maritime vessel may be verified, such as based on images corresponding to the timestamps and to the reception polygons of the terrestrial stations. For example, the images may depict an area within the reception polygon of the terrestrial station during the timestamps. In some exemplary embodiments, images may be scanned and classified to identify images depicting ships, and to identify properties of the depicted ships. In some exemplary embodiments, in order to verify whether or not a depicted image comprises the tampering vessel, the image may be processed with one or more computer vision techniques to identify one or more vessels therein, and extract one or more attributes or characteristics of the depicted vessels. In some exemplary embodiments, the extracted characteristics may be matched against the vessel, e.g., a reported type thereof, a diameter thereof, profile information thereof, or the like. In case the selected images depict an object potentially representing the maritime vessel, the true path may be verified as including the true location of the vessel, a segment thereof may be verified as true, or the like. In some exemplary embodiments, the hidden maritime activities may be verified similarly, as part of the path, or the like.

In some exemplary embodiments, computer vision techniques, or any other image analysis techniques, may be used to analyze optical images that depict areas of interest in which the vessel is estimated to perform an STS activity or a port activity in one of the potential paths, perform object detection thereof, or the like. In some exemplary embodiments, in case that a hidden activity includes an estimated STS event, images may be scanned to identify a butterfly-like shape or pattern which may correspond to an STS meetings, e.g., using one or more computer vision techniques, tip-and-cue techniques, or the like. In some exemplary embodiments, in case that a hidden activity includes an estimated port event, which may comprise identifying the vessel waiting at the entrance of the port (e.g., in case of congestion or blocked view of the port), docking within the port, loading cargo to or from small ships at the entrance to the port, or the like, images depicting the port, an entrance thereto, or the like, may be scanned using one or more computer vision techniques, tip-and-cue techniques, or the like.

In some exemplary embodiments, in response to determining or verifying that the location-reporting signals are fabricated, that the true path is verified, or the like, one or more responsive actions may be performed. In some exemplary embodiments, a responsive action may comprise alerting a user regarding the maritime vessel, e.g., suggesting to the user to disassociate from the maritime vessel, alerting a user that illicit ship-to-ship transfer is probable, alerting a user that illicit port calls are probable, or the like. In some exemplary embodiments, properties of the location fabrication event may be provided to users, e.g., a fraudulent period of the location fabrication event, estimated hidden activities performed during the location fabrication event, verified hidden activities performed during the location fabrication event, images associated with the hidden activities, verification images, properties of a second vessel with which hidden activities are estimated to be performed, or the like. In some exemplary embodiments, one or more graphical presentations of the potential paths may be generated over a map. In some exemplary embodiments, a graphical presentation may provide an estimated timeframe and duration for each maritime event, a probability score of each path, a verification status of each maritime event, or the like.

Figure 3A:
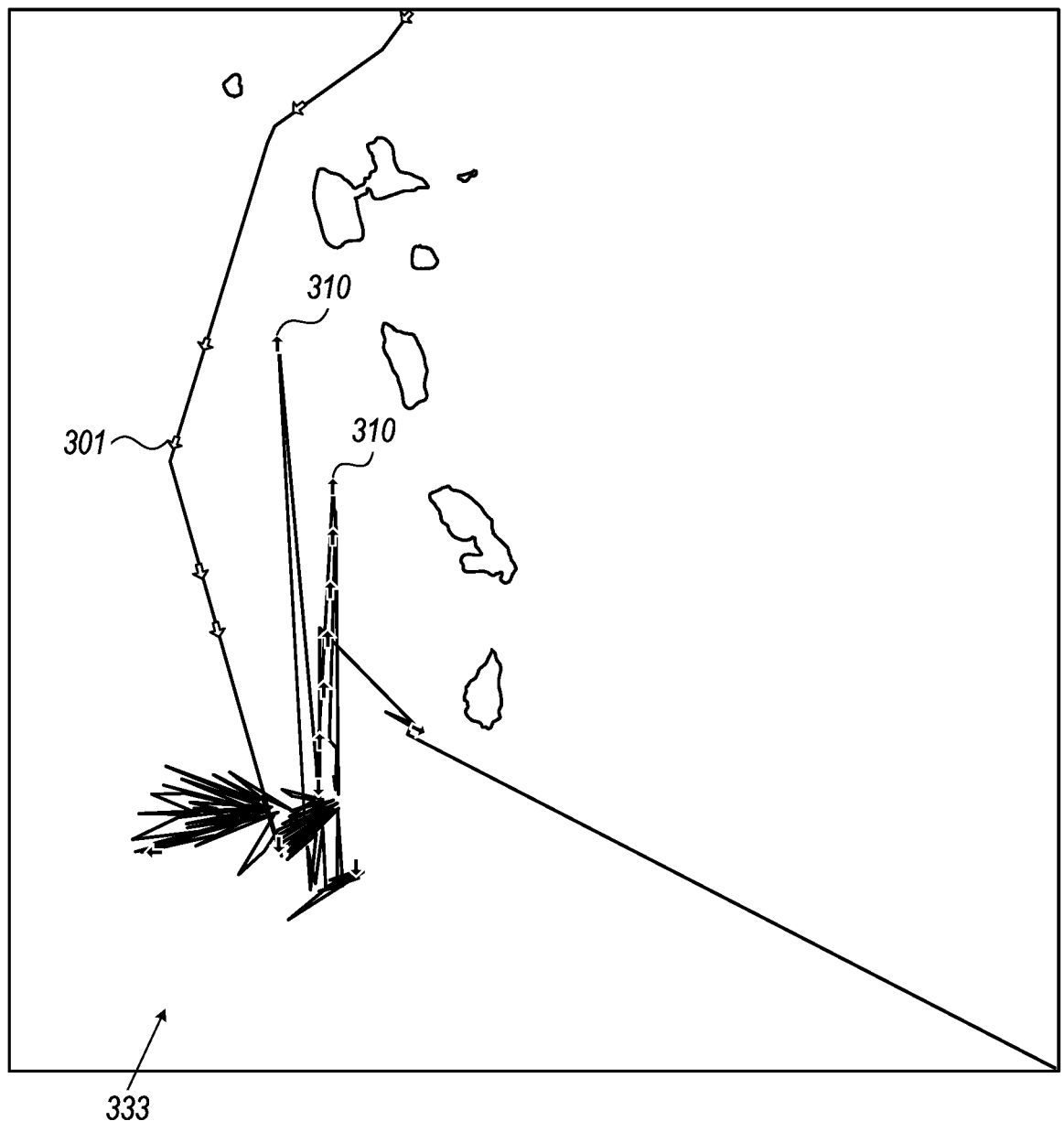

Referring now to FIG. 3A illustrating an exemplary scenario, in accordance with some exemplary embodiments of the disclosed subject matter.

In some exemplary embodiments, in the depicted scenario, a vessel named Lagan (or any other name) may be reportedly drifting for a number of days. As illustrated in FIG. 3A, the vessel may report an active engine during active Points 301, and then report a drifting state (with an inactive engine) during drifting Points 310. In some exemplary embodiments, Lagan may report Drifting Patterns 333 including drifting points, active engine points, or the like, that correspond to a period of loitering in a same geographical zone. In some exemplary embodiments, one or more fabrication indicators may indicate that the Drifting Patterns 333 is fabricated. For example, the geographical zone formed by the reported coordinates and the duration of Drifting Patterns 333 may not match common behavioral patterns, may not be economically beneficial, may include unlikely travel areas such as areas outside popular shipping lanes, may include unlikely or unfeasible paths, or the like, which may indicate that a location fabrication event has occurred.

In some exemplary embodiments, a fraudulent period may be defined, estimated, or the like, based on Drifting Patterns 333, fabrication indicators derived therefrom, additional reported data from Lagan, or the like. For example, the fraudulent period may be defined to include the drifting period, e.g., between Sep. 2, 2021 and May 3, 2021, during which Drifting Patterns 333 may be reported, which may correspond to a beginning and end of an identified synthetic path reported by Lagan. In some exemplary embodiments, one or more fabrication indicators may be searched for during the fraudulent period. For example, data obtained from the vessel during the fraudulent period may be analyzed to identify whether the vessel reported a new destination during the fraudulent period, whether the vessel has reported a change in its draft, a change in its Estimated Time of Arrival (ETA), or the like.

Figure 3B:
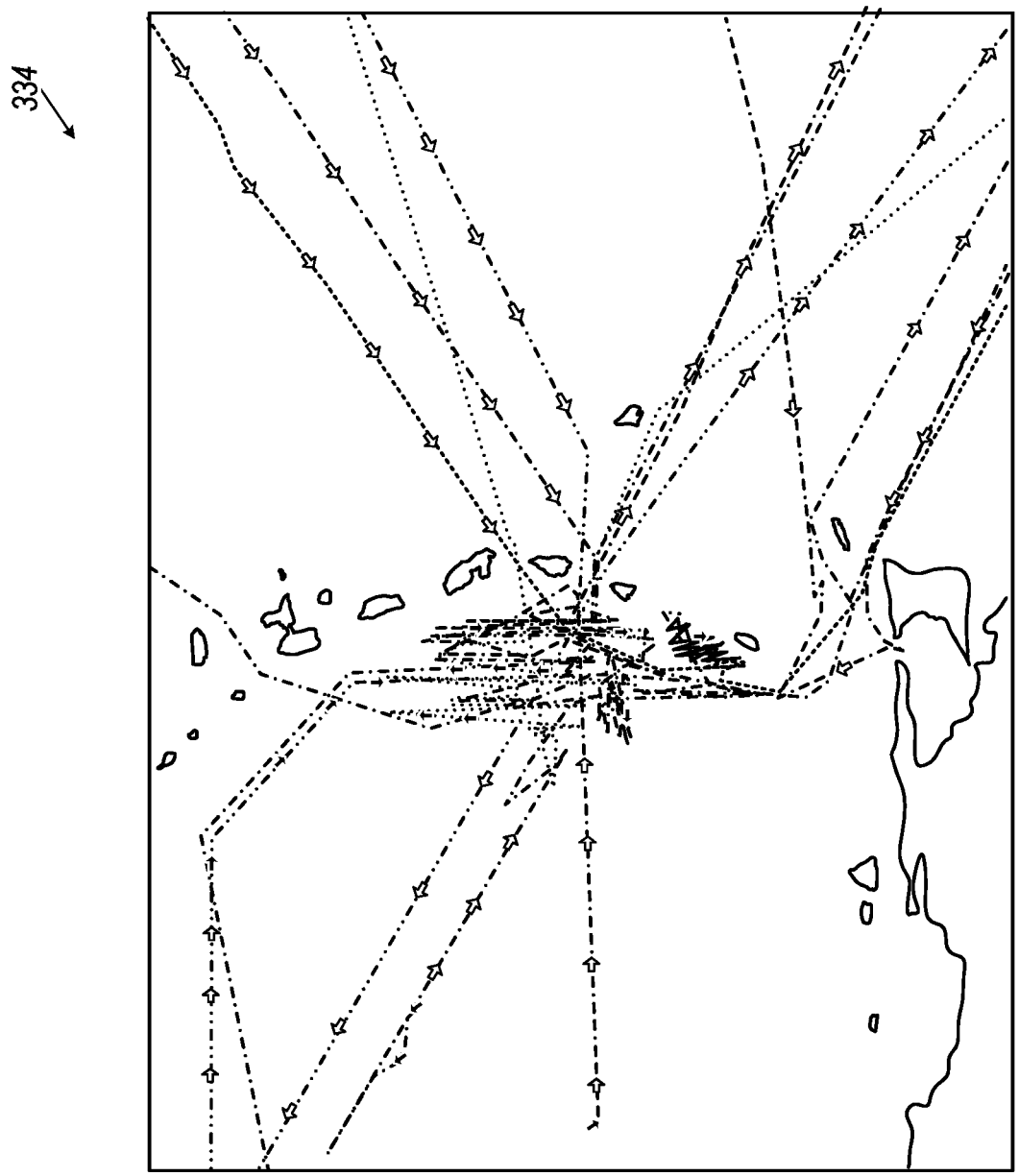
Figure 3B:
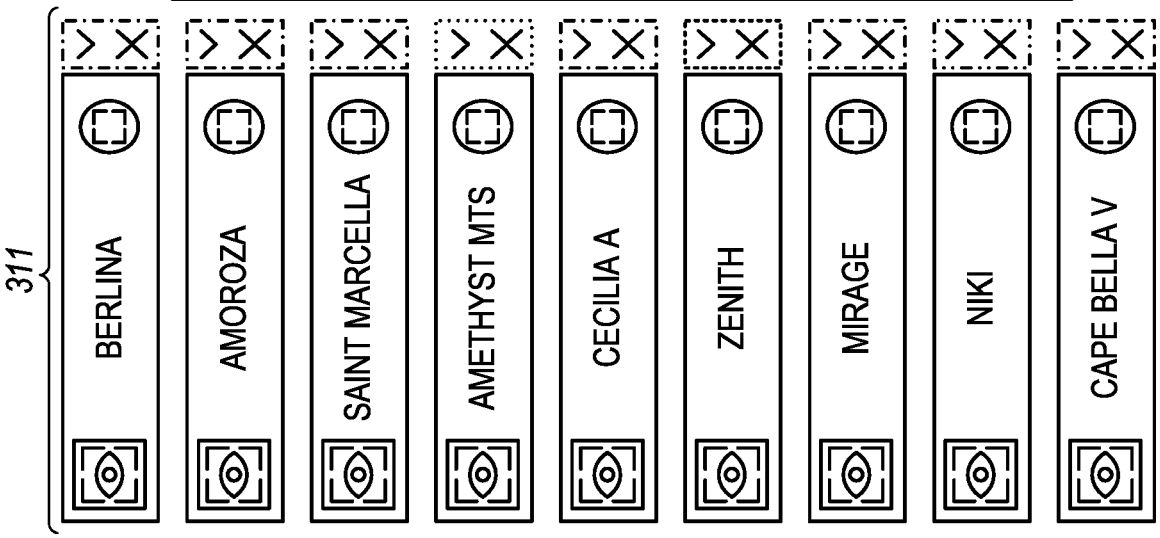

Referring now to FIG. 3B illustrating exemplary paths of an identified fleet, in accordance with some exemplary embodiments of the disclosed subject matter.

In some exemplary embodiments, based on the analysis of the behavioral patterns of Lagan in FIG. 3A, one or more additional ships with similar Drifting Patterns 334, behavioral patterns, profiles, or the like, referred to as Fleet 311, may be identified from a maritime database. In some exemplary embodiments, the vessels of Fleet 311 may be identified as belonging to the fleet based an analysis of a maritime database retaining historic communications from multiple vessels that are accumulated over a timeframe. In some exemplary embodiments, the vessels of Fleet 311 may be identified by matching behavioral patterns of Lagan against behavioral patterns of other vessels of the maritime database, matching Drifting Patterns 334 against Drifting Patterns 333, or the like.

In some exemplary embodiments, Fleet 311 may comprise multiple vessels with Drifting Patterns 334 that have drifted offshore from a similar or same geographical location as Lagan, for similar timeframes, with similar drifting patterns, with similar fabrication indicators, or the like. In the depicted scenario, Fleet 311 may comprise vessels that load cargo in sanctioned ports while reporting synthetic drifting patterns offshore a reported area, e.g., the Caribbean islands. In some exemplary embodiments, vessels of Fleet 311 may be identified based on properties or data associated with the vessels of Fleet 311 that are directly associated to the fraudulent period. In some exemplary embodiments, Fleet 311 may comprise multiple vessels that have reported a similar draft change indicating they were loaded or unloaded during the fraudulent period, a similar ETA change, a similar destination change, or the like. In some exemplary embodiments, the drifting patterns of Fleet 311, of Lagan, or the like, may be identified as synthetic, false, fabricated, or the like, based on the drifting patterns being characterized by sharp, unfeasible turns, by geometric unfeasible paths, or the like.

In some exemplary embodiments, vessels of Fleet 311 may be identified based on properties or data associated with the vessels of Fleet 311 that are not directly associated to the fraudulent period. For example, vessels of Fleet 311 may be identified based on identifying shared historic patterns with Lagan, such as the vessels having common ownership patterns, the vessels being owned by a same entity, the vessels reporting a same type of vessel, the vessels reporting a common flag currently or in the past, the vessels reporting a common destination currently or in the past, or the like. For example, vessels of Fleet 311 may be identified based on an ownership analysis indicating that some or all of the vessels reported a similar ownership, such as being owned by a same shipping company, by companies based in a same country, by companies associated to a common entities, or the like. As another example, vessels of Fleet 311 may report that they are owned by suspicious companies that have no address, have no clear ownership indication, or the like, which may constitute a common ownership pattern. As another example, vessels of Fleet 311 may be identified based on an identity analysis indicating that some or all of the vessels reported a same flag in overlapping timeframe, in non-overlapping timeframes, or the like. In some exemplary embodiments, in case a registration of the vessels to the same flag took place prior to the corresponding suspicious behavioral patterns of each vessel, such as the identified Drifting Patterns 333 of Lagan, this may constitute a fabrication indicator. For example, a suspicious pattern may include identifying vessels that report a common flag, that change an affiliation a similar timeframe after being purchased by a similar or associated entity, or the like. As another example, vessels of Fleet 311 may be identified based on a destination analysis indicating that some or all of the vessels reported a change of destination, with correlating destinations, corresponding timeframes of the change with respect to the traveled path, corresponding ETAs, or the like. In some exemplary embodiments, the destination changes may occur during the fraudulent timeframe, after the fraudulent timeframe, both, or the like. As another example, vessels of Fleet 311 may be identified as belonging to a same fleet based on a draft analysis indicating that the vessels updated their draft to a same status, e.g., full or empty, upon their destination change, regardless of the destination change, in corresponding timeframes with respect to the traveled path, or the like.

Referring now to FIG. 3C illustrating an exemplary report, in accordance with some exemplary embodiments of the disclosed subject matter. In some exemplary embodiments, Report 300 may indicate, for each ship of Fleet 311, an associated risk of a location fabrication event, which may be determined based on the identified fabrication indicators, weights thereof, or the like. In some exemplary embodiments, Report 300 may indicate, for each ship of Fleet 311, additional ship properties such as IMO, flag, ship class, subclass, or the like. In some exemplary embodiments, Report 300 may be provided to a user, operator, or the like, such as via a UI layer. In some exemplary embodiments, the risk may include a probability, a tier level (such as high, medium, and low), or any other ranking manner. In some exemplary embodiments, the risk level or tier of the location fabrication event may be determined based on a classifier, a scoring module, or the like, which may utilize the fabrication indicators therefor. In some exemplary embodiments, a classifier or scoring module may be configured to determine the risk by balancing determined indicators, such as based on a weight of each indicator, a hierarchy thereof, heuristics, a score of each indicator, a determined relation between the indicators, or the like.

Figure 3D:
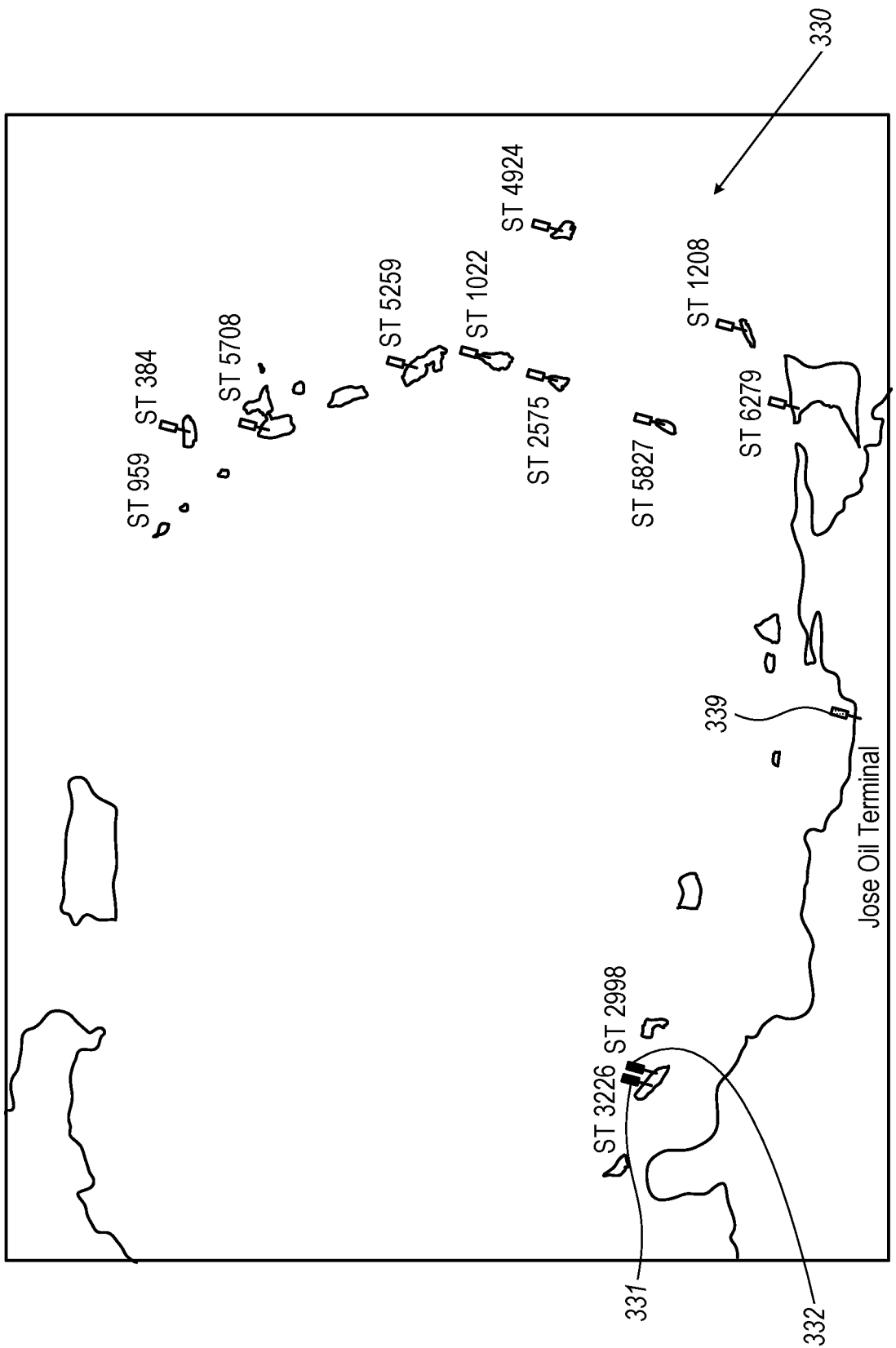

Referring now to FIG. 3D illustrating terrestrial stations, in accordance with some exemplary embodiments of the disclosed subject matter.

In some exemplary embodiments, in case the analyzed vessel (e.g., 'Lagan') includes a tampering vessel, the synthetic data of its location-reporting signals may be generated by a tampering agent of the vessel that includes a terrestrial tampering agent, a maritime tampering agent, an onboard maritime agent, or the like. In some exemplary embodiments, based on the location of the tampering agent, terrestrial stations may be used to determine or verify the location fabrication event. In the scenario depicted by FIG. 3D, the tampering agent of Lagan may include a terrestrial tampering agent that is near one or more terrestrial stations such as Terrestrial Stations 331 and 332 (denoted ST 3226 and ST 2998, respectively). Alternatively, the tampering agent of Lagan may include an onboard tampering agent, and Lagan may travel near Terrestrial Stations 331 and 332. In some exemplary embodiments, the reported locations that are reported by Lagan may indicate that Lagan is performing Drifting Patterns 333 near Terrestrial Stations 330.

In some exemplary embodiments, reception polygons of Terrestrial Stations 330 may indicate that signals from Lagan should be received by at least some of Terrestrial Stations 330 during the fraudulent timeframe, since Drifting Patterns 333 are covered by the reception polygons of Terrestrial Stations 330. In some exemplary embodiments, reception polygons of Terrestrial Stations 331 and 332 may indicate that signals from Lagan should not be received by Terrestrial Stations 331 and 332, as the reported location of Lagan is external to the reception polygons of Terrestrial Stations 331 and 332. In some exemplary embodiments, reception polygons of terrestrial stations may be obtained from a server, or determined locally, e.g., by a computing device analyzing the maritime data, such as based on historic locations of vessels that were received by each terrestrial station.

In some exemplary embodiments, one or more terrestrial stations that received signals from Lagan may be compared to the estimated terrestrial stations that are estimated to receive the signals from Lagan (e.g., having reception polygons that cover the reported location of Lagan). In some exemplary embodiments, in the depicted scenario, Terrestrial Stations 331 and/or 332 may receive AIS transmissions from Lagan, although the reception polygons of Terrestrial Stations 331 and/or 332 may not cover the reported location of Lagan, e.g., in an area of Drifting Patterns 333. In some exemplary embodiments, in the depicted scenario, none of Terrestrial Stations 330 may receive signals from Lagan, although the reception polygons of Terrestrial Stations 330 cover the reported location of Lagan. In some exemplary embodiments, terrestrial stations that were expected to receive the signals and did not, e.g., Terrestrial Stations 330, may be analyzed to determine whether or not they are active, such as based on whether or not they received AIS signals from other vessels prior to the fraudulent timeframe, during the fraudulent timeframe, after the fraudulent timeframe, a certain adjacent timeframe therefrom, or the like. In case a station is determined to not be active, it may be excluded from the comparison.

In some exemplary embodiments, based on determining that the receiving terrestrial stations contradict the reported location of Lagan, the AIS transmissions from Lagan may be determined to be at least partially fabricated, false, or the like. In some exemplary embodiments, the contradiction between the receiving terrestrial stations and the terrestrial stations that were estimated to receive the AIS transmissions based on the reported location of Lagan may indicate that the reported paths of Drifting Patterns 333 are synthetic, and that Drifting Patterns 333 are being generated and transmitted by a tampering agent that is located within the reception polygons of Terrestrial Stations 331 and/or 332. The tampering agent may include a terrestrial tampering agent near Terrestrial Stations 331 and 332, or a maritime (e.g., onboard) tampering agent near Terrestrial Stations 331 and 332.

In some exemplary embodiments, the AIS transmissions from Lagan may be determined to be false in case Terrestrial Stations 331 and/or 332 have received location-reporting signals from Lagan only during the fraudulent timeframe, in case Terrestrial Stations 331 and/or 332 have received a certain number of location-reporting signals (e.g., 10, 20, or the like) from Lagan during the fraudulent timeframe, or the like. In some exemplary embodiments, each fabrication indicator that is identified and complied with, may be increase a probability of a location fabrication event, increase a confidence score of identifying a location fabrication event, or the like. In some exemplary embodiments, a classifier may be configured to classify the location fabrication events according to a probability of the data being fabricated. In some exemplary embodiments, the classifier may comprise a machine learning classifier, an anomaly detector, a heuristics-based classifier, a deep learning classifier, a data-driven classifier, or the like.

In some exemplary embodiments, one or more hidden activities of Lagan that were performed during the fraudulent timeframe in a non-reported location may be estimated, e.g., based on the location of the vessel prior to fraudulent timeframe, based on the location of the vessel after the fraudulent timeframe, based on the location of the receiving stations such as Terrestrial Stations 331 and/or 332, based on environmental conditions, based on sanctioned or illicit entities in the area, based on ports that could be used by Lagan during the fraudulent period, or the like. For example, Port 339 may be identified as a port that can serve the type of vessel of Lagan, had sufficient resources to dock Lagan during the fraudulent period, is in a distance that enables Lagan to travel thereto and back during the fraudulent period, or the like. For example, in case Lagan includes an oil-carrying vessel that requires special conditions for performing a port call, Port 339 may be estimated as a hidden destination in case it includes an oil terminal that is within the geographical range of the vessel during the fraudulent timeframe, which enables to load or unload oil. Accordingly, Port 339 may be indicated as a possible hidden destination or activity of Lagan. One or more additional or alternative hidden destinations may be determined, presented, or the like. In some exemplary embodiments, hidden destinations may be verified against observations, imagery, or the like.

Figure 3E:

Referring now to FIG. 3E illustrating an exemplary reception polygon, in accordance with some exemplary embodiments of the disclosed subject matter. In some exemplary embodiments, Reception Polygon 340 may include one or more reception polygons of Terrestrial Stations 331 and/or 332. In some exemplary embodiments, Reception Polygon 340 may be used to identify whether or not the location-reporting signals from should be received by Terrestrial Stations 331 and/or 332. In some exemplary embodiments, Reception Polygon 340 may be used to estimate a location or zone of a tampering agent, a type thereof (e.g., terrestrial, onboard), or the like.

Referring now to FIG. 3F illustrating a table with exemplary raw data, in accordance with some exemplary embodiments of the disclosed subject matter. In some exemplary embodiments, the location fabrication event may be determined based on a raw data analysis. In some exemplary embodiments, location-reporting signals from Lagan during a first period, AIS Transmissions 351, may be determined to be true, while location-reporting signals from Lagan during a second period, AIS Transmissions 353, may be determined to be false, synthetic, or the like. In some exemplary embodiments, AIS Transmissions 353 may be determined to be false based on one or more fabrication indicators such as non-location parameters of the AIS transmissions complying with one or more conditions, constraints, patterns, or the like. In some exemplary embodiments, AIS Transmissions 353 from Lagan may be determined to be false in case of receiving reports from Lagan with uniform COG and SOG sections, or the like.

As illustrated in FIG. 3F, AIS Transmissions 353 from Lagan may have one or more patterns, values, or the like, that are different from AIS Transmissions 351 obtained from Lagan prior to the fraudulent timeframe, or obtained from a different vessel in a same timeframe. In some exemplary embodiments, AIS Transmissions 353 may include multiple AIS transmissions or other reports with parameter values that are received from Lagan during the fraudulent timeframe. For example, AIS Transmissions 351 may include varying true values of a COG and SOG parameters, as opposed to AIS Transmissions 353, which may include steady COG and SOG values, COG and SOG values interchanging between predefined values, a repetition of two values, or the like. In some exemplary embodiments, AIS Transmissions 351 may be received by terrestrial stations with reception polygons that match the reported locations, in contrast to AIS Transmissions 353, which may be received by satellites only, or by terrestrial stations with reception polygons that exclude the reported location of Lagan.

In some exemplary embodiments, a discrepancy between synthetic data and true data may be identified based on a raw data analysis, e.g., based on an inconsistency between measured values of the COG parameter and the TH parameter (not illustrated). In some cases, fabricated data may include identical or similar COG and TH values for a low speed, e.g., near zero. In some exemplary embodiments, a discrepancy between synthetic data and true data may be identified based on duplicated values such as duplicated GPS coordinates. In some exemplary embodiments, in some cases, a discrepancy between synthetic data and true data may be identified based on the same geographical coordinates being reported during the entire fraudulent timeframe, portions thereof, or the like. In some exemplary embodiments, in some cases, a discrepancy between synthetic data and true data may be identified based on a same or repetitive speed measurements being reported during the entire fraudulent timeframe, portions thereof, or the like. In some exemplary embodiments, an analysis of the raw data may identify duplicated fields, indicating that AIS Transmissions 353 are fabricated. In some exemplary embodiments, a discrepancy between synthetic data and true data may be identified based on identifying that the COG values, SOG values, GPS coordinates, speed values, or the like, remain consistent during the fraudulent timeframe, while one or more parameters, such as the TH parameter, have reported values that change continuously, showing the true path direction. In some exemplary embodiments, a discrepancy between synthetic data and true data may be identified based on identifying that the COG values, SOG values, GPS coordinates, the speed values, or the like, remain consistent during the fraudulent timeframe, without reporting a lost or found event.

Figure 3G:
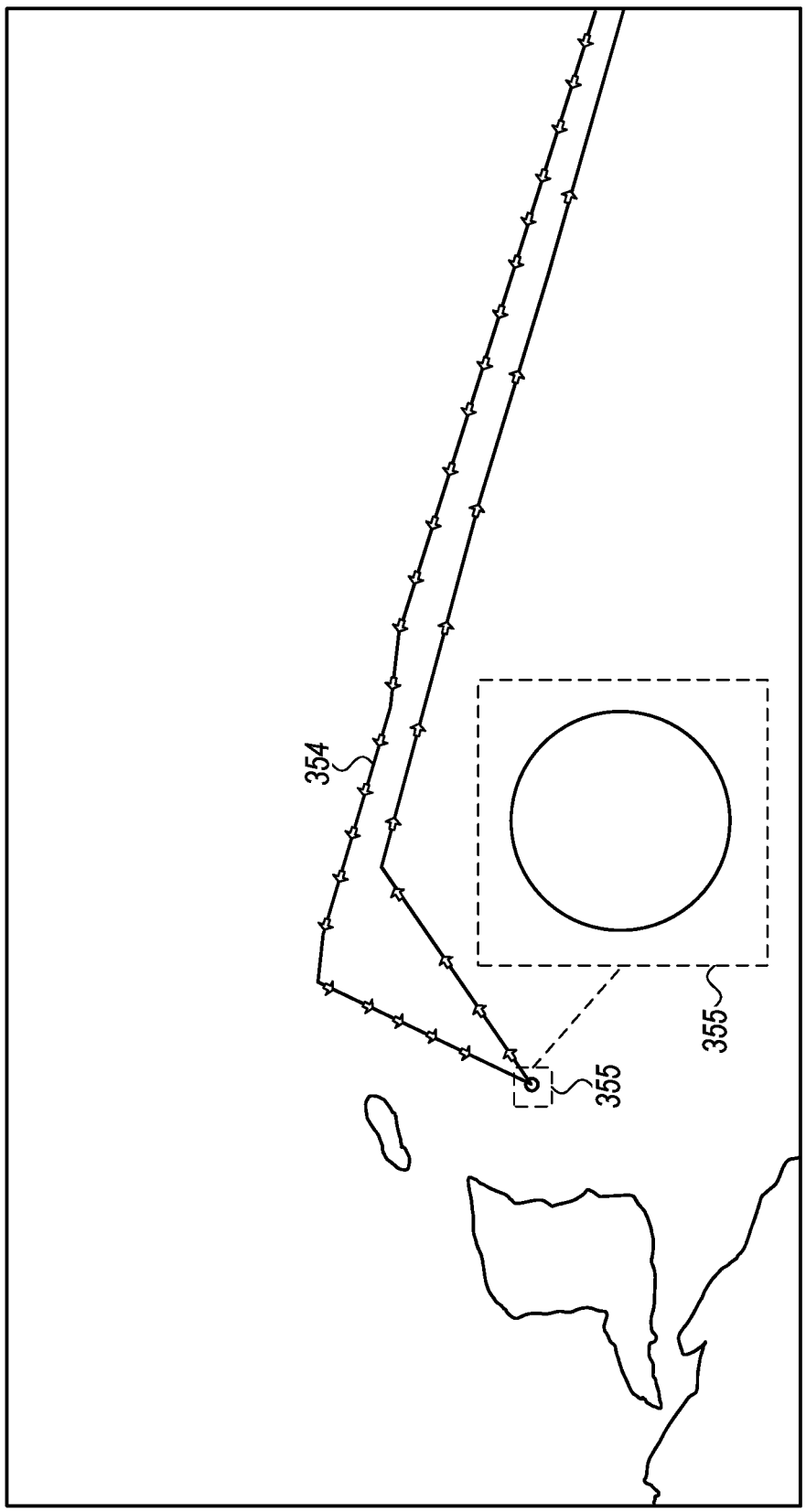

Referring now to FIG. 3G illustrating an exemplary scenario, in accordance with some exemplary embodiments of the disclosed subject matter. In some exemplary embodiments, the location fabrication event of Lagan may be determined based on an analysis of the synthetic maritime path reported by Lagan, e.g., including an active engine mode of Lagan. In some exemplary embodiments, the reported Path 354 of Lagan may be analyzed to identify one or more fabrication indicators thereof, such as identifying contradictory or unfeasible properties thereof. In some exemplary embodiments, the reported Path 354 of Lagan may be generated based on accumulated fabricated transmissions from Lagan over time. For example, as illustrated in FIG. 3G, the reported Path 354 of Lagan may include an unfeasible Shape 355, which may include a symmetrical behavioral pattern, a perfect geometrical circle, or any other unfeasible shape that contradicts technical limitations on sailing. In some cases, unfeasible Shape 355 may include a shape of a path that cannot be true due to technical constraints of ships, due to environmental circumstances that may not enable vessels to travel via entirely symmetrical geometric patterns, or the like. In some exemplary embodiments, fabrication indicators may include SOG patterns that are unnatural for high sea or open sea behavior.

In some exemplary embodiments, in some cases, unfeasible properties of a reported path may result from an onboard tampering agent that transmits signal from the vessel itself, from a terrestrial tampering agent transmitting signals from remotely on behalf of the vessel, or the like. In some exemplary embodiments, onboard tampering agents may generate one or more synthetic values for one or more properties, including synthetic location coordinates, which may or may not be combined with one or more true values of remaining properties from onboard sensors. In some exemplary embodiments, onboard tampering agents may be characterized by one or more onboard fabrication indicators, such as by the COG values staying consistent during the fraudulent timeframe while the TH values continuing to change with the true sailing pattern of the vessel. In some exemplary embodiments, a discrepancy between the synthetic data and the true data may be identified based on one or more fabrication indicators.

Figure 3H:
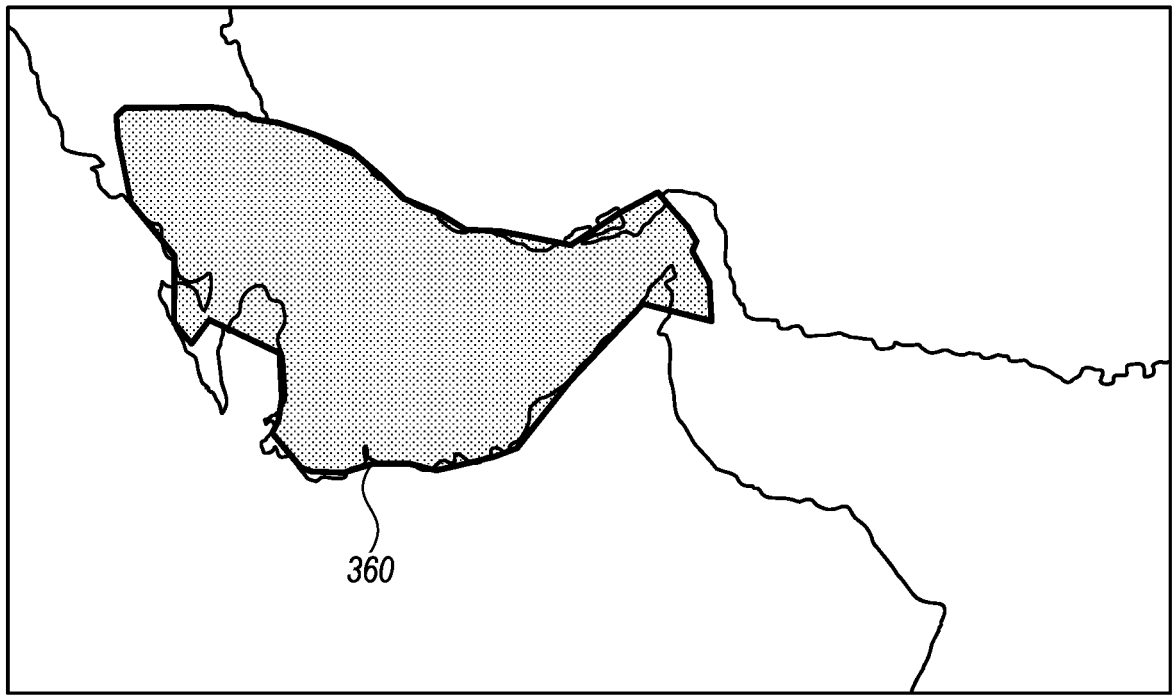
Figure 3H:
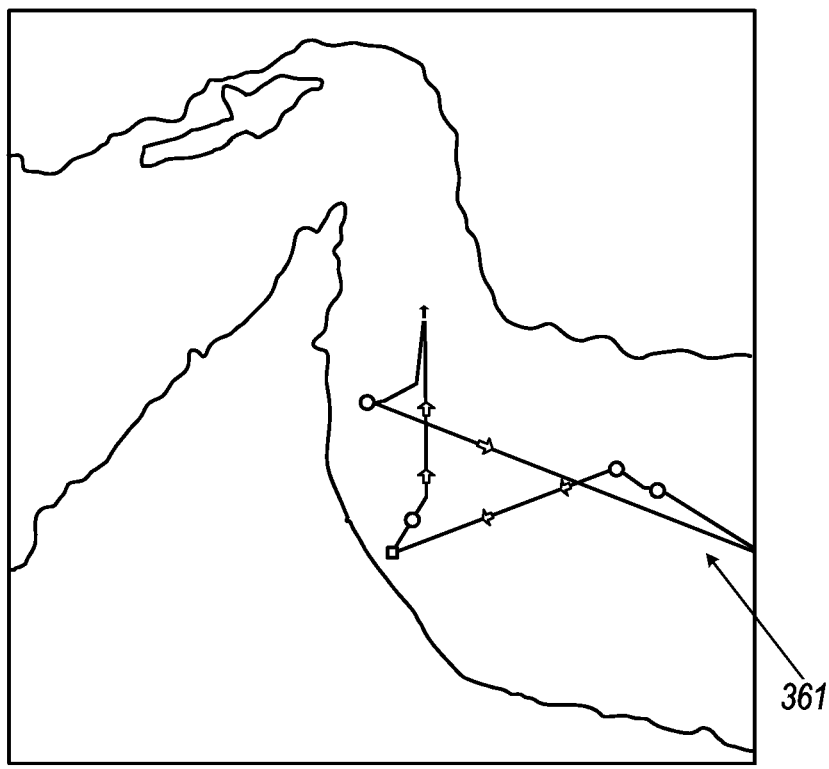

Referring now to FIG. 3H illustrating an exemplary scenario, in accordance with some exemplary embodiments of the disclosed subject matter.

Figure 3I:
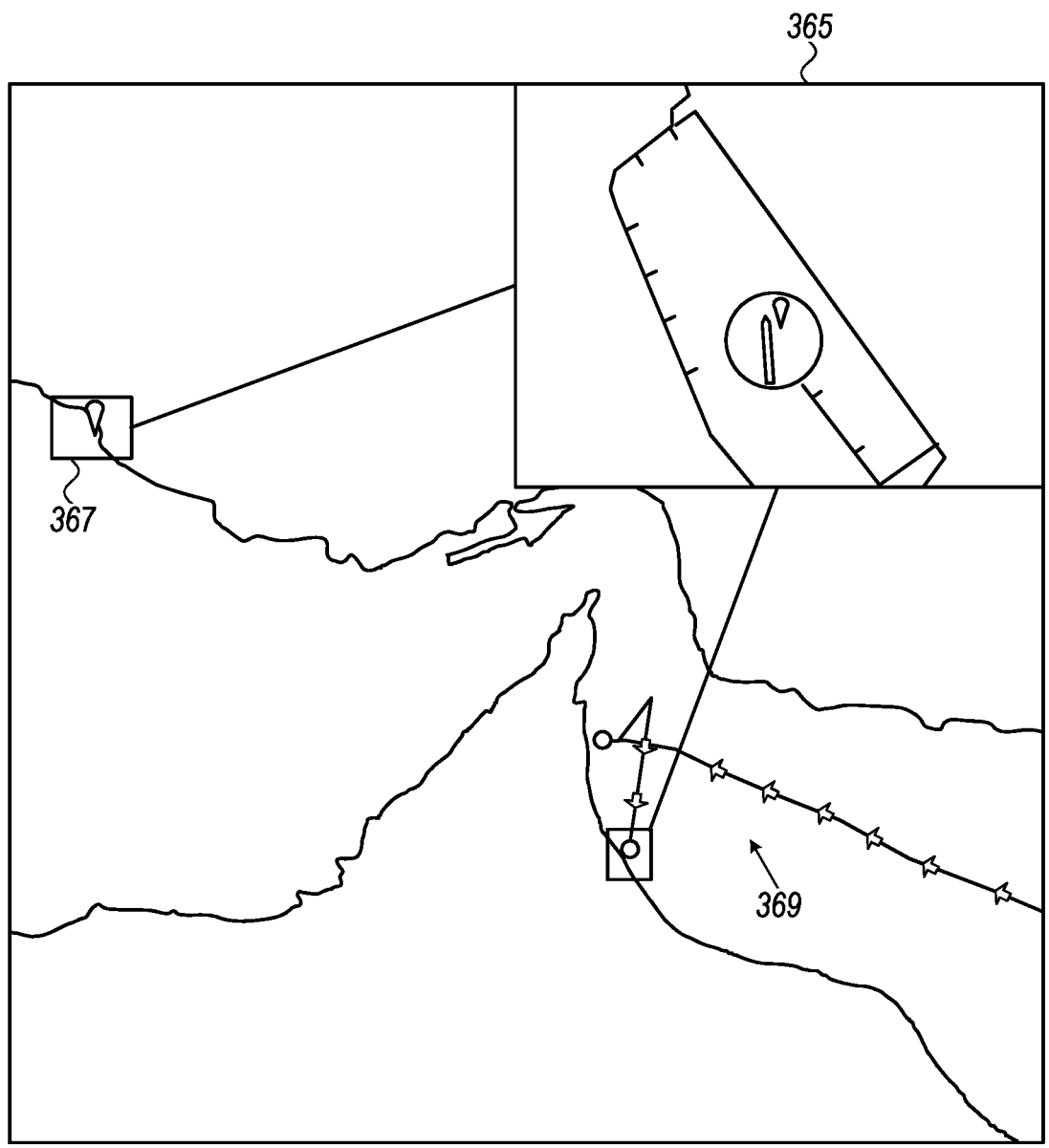

In some exemplary embodiments, in case of an onboard tampering agent, a true path of a vessel may be estimated, e.g., based on a reception polygon of terrestrial stations that receive signals from the vessel, over time. For example, as depicted by FIG. 3H, one or more location-reporting signals from the vessel may be received by a terrestrial station with a Reception Polygon 360. According to this example, the vessel may be estimated to be located within Reception Polygon 360. In some exemplary embodiments, a False Path 361 of Lagan may be reported by the vessel. In some exemplary embodiments, False Path 361 may be determined to include a fabricated path, as it may be external to Reception Polygon 360. In some exemplary embodiments, False Path 361 may be determined to include a fabricated path based on any other fabrication indicators, suspicious patterns, or the like Referring now to FIG. 3I illustrating the exemplary verification, in accordance with some exemplary embodiments of the disclosed subject matter.

In some exemplary embodiments, images such as satellite imagery, drone images, radar images, aerial photography, spatial-temporal images of the area, or the like, may be accumulated and analyzed, in order to locate the vessel during the fraudulent timeframe. In some exemplary embodiments, the images may be selected to comprise images that were captured during the fraudulent timeframe, and that depict an area that is within the overlapping zones of terrestrial stations that received signals from the vessel. In some exemplary embodiments, the images may be selected to comprise images that depict areas that are estimated to be traveled by the vessel during the fraudulent period. In some exemplary embodiments, although the vessel may report a False Path 361, the vessel may be identified within an image such as Image 365, which may depict a True Location 367 of the vessel during the fraudulent period that is external to the zone of False Path 361. In some exemplary embodiments, the True Location 367 may be located within reception polygons of terrestrial stations that received signals from the vessel during the fraudulent period. In some exemplary embodiments, True Location 367 of the vessel may be used to adjust or regenerate the estimated path that vessel traveled, hidden events that were estimated to be performed thereby, or the like.

In some exemplary embodiments, satellite imagery may be used to identify hidden activities of the vessel during the fraudulent timeframe, until the entire travel path and hidden activities of the vessel during the fraudulent timeframe, or portions thereof, are verified. In some exemplary embodiments, in order to identify a hidden STS meeting with the vessel during the fraudulent timeframe, a large volume of maritime images may be analyzed. In some exemplary embodiments, the volume of images may be processed using computer vision techniques, or any other techniques, in order to identify a butterfly-like pattern indicating an STS maritime transfer involving an object that represents the vessel. In some exemplary embodiments, True Location 367 may be identified based on image verifications, based on a round trip time to one or more terrestrial stations that can receive the vessel's signals, based on radio signals emitted from the vessel that can be detected by one or more radio sensors, based on maritime images, or the like.

In some exemplary embodiments, a Next Path 369 of the vessel may include a path traveled by the vessel after the fraudulent timeframe, e.g., returning to the area of the False Path 361.

Figure 3J:
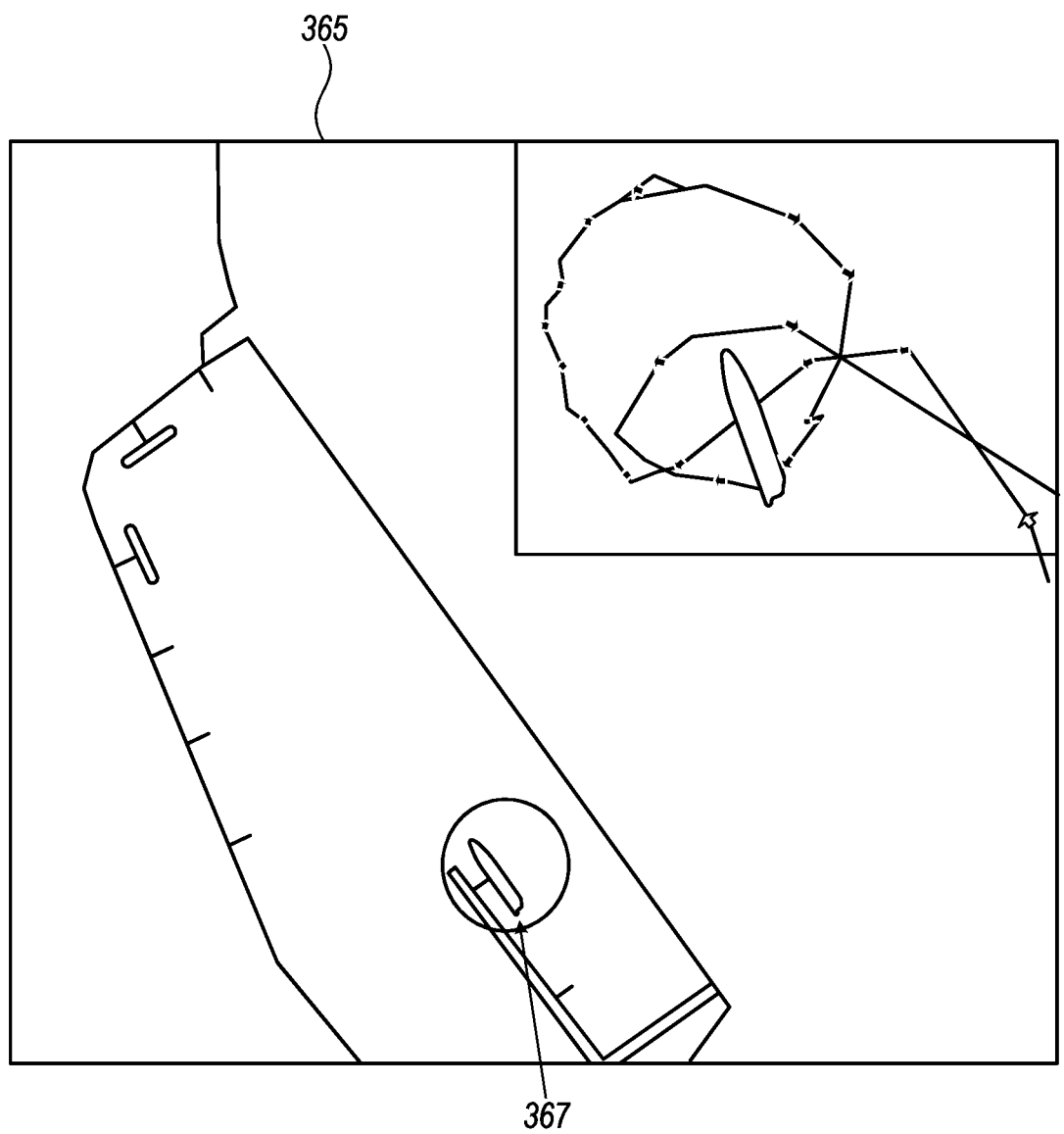

Referring now to FIG. 3J illustrating a close up of Image 365, in accordance with some exemplary embodiments of the disclosed subject matter. As illustrated in FIG. 3J, Image 365 depicts an object that represents the vessel in its True Location 367.

Figure 4:
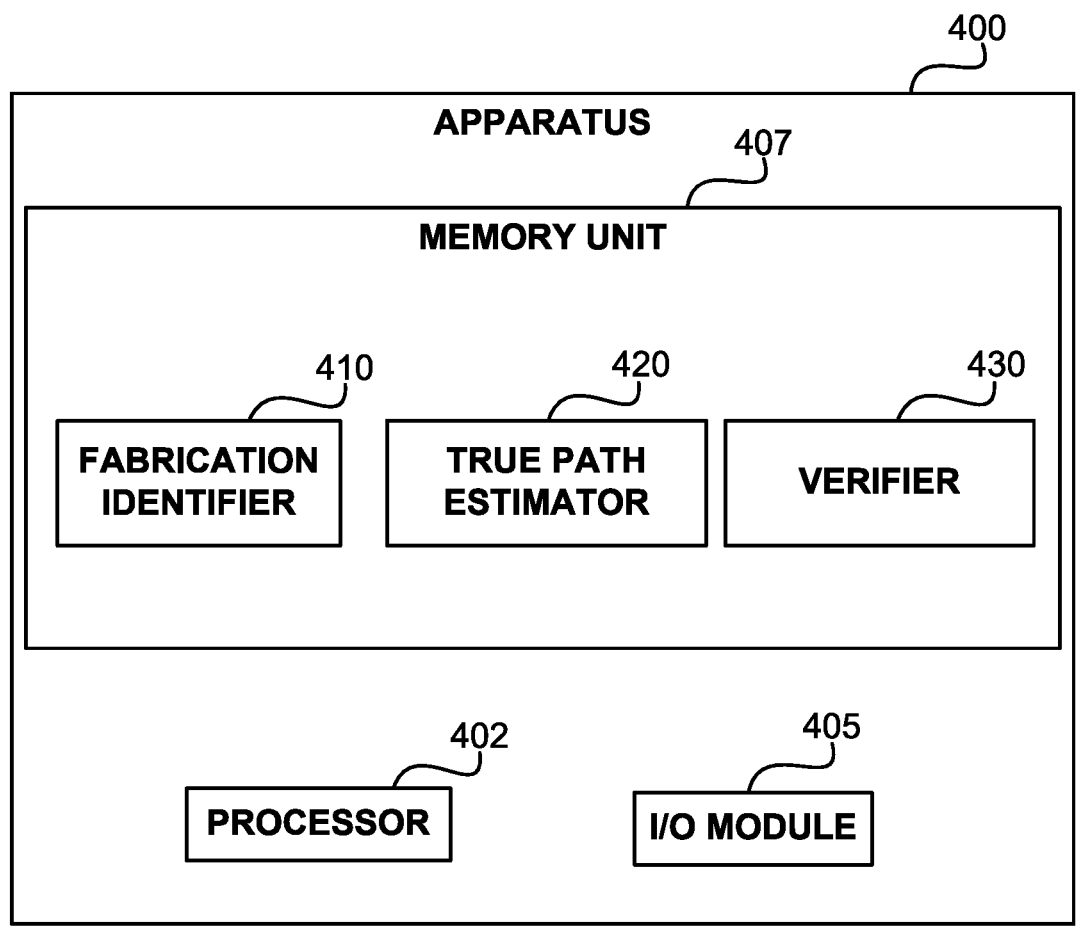
FIG. 4 illustrates a block diagram of an apparatus, in accordance with some exemplary embodiments of the disclosed subject matter.

Referring now to FIG. 4 showing a block diagram of an apparatus, in accordance with some exemplary embodiments of the disclosed subject matter.

In some exemplary embodiments, an Apparatus 400 may comprise a Processor 402. Processor 402 may be a Central Processing Unit (CPU), a microprocessor, an electronic circuit, an Integrated Circuit (IC) or the like. Processor 402 may be utilized to perform computations required by Apparatus 400 or any of its subcomponents. Processor 402 may be configured to execute computer-programs useful in performing the methods of FIGS. 1-2, or the like.

In some exemplary embodiments of the disclosed subject matter, an Input/Output (I/O) Module 405 may be utilized to provide an output and receive input from a user. I/O Module 405 may be used to transmit and receive information to and from the user or any other apparatus, e.g., a plurality of vessels, data centers, or the like.

In some exemplary embodiments, Apparatus 400 may comprise a Memory Unit 407. Memory Unit 407 may be a short-term storage device or long-term storage device. Memory Unit 407 may be a persistent storage or volatile storage. Memory Unit 407 may be a disk drive, a Flash disk, a Random Access Memory (RAM), a memory chip, or the like. In some exemplary embodiments, Memory Unit 407 may retain program code operative to cause Processor 402 to perform acts associated with any of the subcomponents of Apparatus 400. In some exemplary embodiments, Memory Unit 407 may retain program code operative to cause Processor 402 to perform acts associated with any of the steps in FIGS. 1-2, or the like.

The components detailed below may be implemented as one or more sets of interrelated computer instructions, executed for example by Processor 402 or by another processor. The components may be arranged as one or more executable files, dynamic libraries, static libraries, methods, functions, services, or the like, programmed in any programming language and under any computing environment.

In some exemplary embodiments, Fabrication Identifier 410 may be configured to accumulate one or more location-reporting signals associated with a vessel, and to determine based therein whether or not a location fabrication event has occurred.

In some exemplary embodiments, True Path Estimator 420 may be configured to obtain an indication of a location fabrication event, e.g., from Fabrication Identifier 410, and estimated a true path of the vessel based on the location-reporting signals associated with a vessel, insights derived therefrom by, or the like. In some exemplary embodiments, the true path may be generated to include one or more maritime events associated with a port, another vessel, or the like.

In some exemplary embodiments, True Path Estimator 420 may be utilized to predict true path based on non-GPS information, such as reception polygons, information from the vessel's bus, heading, speed, draft, vessel's type, or the like. The estimated true path may be utilized to determine a location fabrication event by Fabrication Identifier 410.

In some exemplary embodiments, True Path Estimator 420 may predict the true path based on an initial location and several follow-up reports. Such true path may be compared with the reported path over several waypoints (e.g., reporting signals) to determine a likelihood of the reported path being a fabricated path. Additionally or alternatively, True Path Estimator 420 may predict short true paths of single legs based on each pair of successive reports. In some exemplary embodiments, True Path Estimator 420 may determine the predicted true path of a single leg from the previous reported location. The single leg true path may be compared with the successive reported location to determine a likelihood that the successive report is fabricated. In some exemplary embodiments, a combination of singe leg estimate true path comparison with reported single leg path and multi-leg estimated true path comparison with reported multi-leg path may be performed and provided to Fabrication Identifier 410 to identify a potential location fabrication event.

In some exemplary embodiments, Verifier 430 may be configured to verify the true path using imagery, observations, or the like, that may correspond in time and location to the estimated true path determined by True Path Estimator 420.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining one or more location-reporting signals of a maritime vessel, wherein the one or more location-reporting signals comprise one or more respective sets of geographical coordinates, each of which having a timestamp;
   determining that the one or more location-reporting signals are at least partially fabricated, wherein said determining is based on identifying a contradiction between a content of the one or more location-reporting signals and external data, wherein the external data comprises information derived from location-reporting signals received from entities external to the maritime vessel, wherein the entities comprise, at least, other maritime vessels; and
   in response to said determining, performing a responsive action, wherein the responsive action is configured to perform:
      verifying or refuting a determination of a potential location fabrication event based on said determining, wherein said verifying or refuting is performed by analyzing images depicting the one or more respective sets of geographical coordinates during a period of their timestamps, wherein the potential location fabrication event is verified in case the images do not depict objects that can represent the maritime vessel; and
      mitigating a risk from the potential location fabrication event by disassociating from the maritime vessel.

2. The method of claim 1, wherein the other maritime vessels are located within a predetermined range from the reported one or more locations of the one or more location-reporting signals at a time indicated by the one or more location-reporting signals.

3. The method of claim 1, the one or more location-reporting signals comprise a plurality of Automatic Identification System (AIS) signals, wherein each AIS signal of the plurality of AIS signals comprises a valuation of a set of parameters, the set of parameters is measurable by one or more sensors of the maritime vessel, wherein the one or more sensors of the maritime vessel comprise at least one of: a positioning system, an electronic navigation sensor, or a rate of turn indicator, wherein based on the information derived from the location-reporting signals received from the other maritime vessels, determining that a likelihood of following a maritime path of the maritime vessel as reported by the one or more location-reporting signals is below a threshold.

4. The method of claim 1, wherein based on the information derived from the location-reporting signals received from the other maritime vessels, determining that a likelihood of following a maritime path of the maritime vessel as reported by the one or more location-reporting signals, while having heading and speed information as reported by the one or more location-reporting signals, is below a threshold.

5. The method of claim 1, wherein said determining is based on environmental conditions as indirectly measured by the other maritime vessels.

6. The method of claim 1, wherein said analyzing the images comprises applying one or more computer vision techniques on the images to extract one or more attributes of depicted vessels, wherein said verifying or refuting of the location fabrication event is utilized to improve an accuracy of a classifier by re-training the classifier using a result of said verifying or refuting as a label of a data point.

7. A non-transitory computer readable medium retaining instructions, which instructions, wherein read by a processor, cause the processor to perform:
   obtaining one or more location-reporting signals of a maritime vessel, wherein the one or more location-reporting signals comprise one or more respective sets of geographical coordinates, each of which having a timestamp;
   determining that the one or more location-reporting signals are at least partially fabricated, wherein said determining is based on identifying a contradiction between a content of the one or more location-reporting signals and external data, wherein the external data comprises information derived from location-reporting signals received from entities external to the maritime vessel, wherein the entities comprise, at least, other maritime vessels; and
   in response to said determining, performing a responsive action, wherein the responsive action is configured to perform:
      verifying or refuting a determination of a potential location fabrication event based on said determining, wherein said verifying or refuting is performed by analyzing images depicting the one or more respective sets of geographical coordinates during a period of their timestamps, wherein the potential location fabrication event is verified in case the images do not depict objects that can represent the maritime vessel; and mitigating a risk from the potential location fabrication event by disassociating from the maritime vessel.

8. The non-transitory computer readable medium of claim 7, wherein the other maritime vessels are located within a predetermined range from the reported one or more locations of the one or more location-reporting signals at a time indicated by the one or more location-reporting signals.

9. The non-transitory computer readable medium of claim 7, wherein based on the information derived from the location-reporting signals received from the other maritime vessels, determining that a likelihood of following a maritime path of the maritime vessel as reported by the one or more location-reporting signals is below a threshold.

10. The non-transitory computer readable medium of claim 7, wherein based on the information derived from the location-reporting signals received from the other maritime vessels, determining that a likelihood of following a maritime path of the maritime vessel as reported by the one or more location-reporting signals, while having heading and speed information as reported by the one or more location-reporting signals, is below a threshold.

11. The non-transitory computer readable medium of claim 7, wherein said determining is based on environmental conditions as indirectly measured by the other maritime vessels.

12. A system comprising: a processor and a memory, wherein the processor is configured to perform:

obtaining one or more location-reporting signals of a maritime vessel, wherein the one or more location-reporting signals comprise one or more respective sets of geographical coordinates, each of which having a timestamp;

determining that the one or more location-reporting signals are at least partially fabricated, wherein said determining is based on identifying a contradiction between a content of the one or more location-reporting signals and external data, wherein the external data comprises information derived from entities external to the maritime vessel, wherein the information derived from the entities comprise, at least, location-reporting signals received from other maritime vessels; and in response to said determining, performing a responsive action, wherein the responsive action is configured to perform:

verifying or refuting a determination of a potential location fabrication event based on said determining, wherein said verifying or refuting is performed by analyzing images depicting the one or more respective sets of geographical coordinates during a period of their timestamps, wherein the potential location fabrication event is verified in case the images do not depict objects that can represent the maritime vessel; and mitigating a risk from the potential location fabrication event by disassociating from the maritime vessel.

13. The system of claim 12, wherein the other maritime vessels are located within a predetermined range from the reported one or more locations of the one or more location-reporting signals at a time indicated by the one or more location-reporting signals.

14. The system of claim 12, wherein based on the information derived from the location-reporting signals received from the other maritime vessels, determining that a likelihood of following a maritime path of the maritime vessel as reported by the one or more location-reporting signals is below a threshold.

15. The system of claim 12, wherein based on the information derived from the location-reporting signals received from the other maritime vessels, determining that a likelihood of following a maritime path of the maritime vessel as reported by the one or more location-reporting signals, while having heading and speed information as reported by the one or more location-reporting signals, is below a threshold.

16. The system of claim 12, wherein said determining is based on environmental conditions as indirectly measured by the other maritime vessels.

* * * * *